(12) United States Patent
Keehr

(10) Patent No.: US 10,972,150 B2
(45) Date of Patent: Apr. 6, 2021

(54) LOW-COST SOFTWARE-DEFINED RFID INTERROGATOR WITH ACTIVE TRANSMIT LEAKAGE CANCELLATION

(71) Applicant: SUPERLATIVE SEMICONDUCTOR, LLC, Carlsbad, CA (US)

(72) Inventor: Edward A. Keehr, Carlsbad, CA (US)

(73) Assignee: SUPERLATIVE SEMICONDUCTOR, LLC, Carlsbad, CA (US)

( * ) Notice: Subject to any disclaimer, the term of this patent is extended or adjusted under 35 U.S.C. 154(b) by 212 days.

(21) Appl. No.: 16/208,904

(22) Filed: Dec. 4, 2018

(65) Prior Publication Data

US 2019/0173528 A1  Jun. 6, 2019

Related U.S. Application Data

(60) Provisional application No. 62/657,811, filed on Apr. 15, 2018, provisional application No. 62/628,289, (Continued)

(51) Int. Cl.
*H04B 5/00* (2006.01)
*H04B 1/38* (2015.01)
*H04B 1/00* (2006.01)

(52) U.S. Cl.
CPC ......... *H04B 5/0062* (2013.01); *H04B 1/0003* (2013.01); *H04B 1/38* (2013.01)

(58) Field of Classification Search
CPC ........ H04B 1/385; H04B 1/59; H04B 5/0062; H04B 5/0075; H04B 7/18506;
(Continued)

(56) References Cited

U.S. PATENT DOCUMENTS 5,034,708 A  7/1991 Adamian et al.
5,276,411 A  1/1994 Woodin, Jr. et al.
(Continued)

FOREIGN PATENT DOCUMENTS

CN  202362811  8/2012
WO  WO 2009104839  8/2009

OTHER PUBLICATIONS

"EPC™ Radio-Frequency Identify Protocols Generation-2 UHF RFID: Specification for RFID Air Interface Protocol for Communications at 860 MHz-960 MHz," Version 2.0.0 Ratified, 152 pages.
Albinsson et al., "A new programmable load for noise parameter determination", IEEE Transactions on Microwave Theory and Techniques, 1991, vol. 39, Issue 2.
(Continued)

*Primary Examiner* — Ajibola A Akinyemi
(74) *Attorney, Agent, or Firm* — Knobbe, Martens, Olson & Bear, LLP

(57) ABSTRACT

An RFID interrogator transceiver with various improvements is proposed. A digital interface element implemented in a field-programmable gate array permits the use of a low-cost, low pin count microcontroller unit to control various integrated circuits within the transceiver both with the complexity afforded by the microcontroller unit and with the speed afforded by the field-programmable gate array. A transmit waveform generation architecture which can store opcodes in a segmented random access memory permits both leisurely loading of information over a digital interface from a low-cost microcontroller unit and fast playback over a wireless interface during low-latency RFID exchanges. Finally, a dual digital second-order resonator infinite-impulse-response filter permits a more hardware efficient channel bandpass filter solution than a finite-impulse-response filter and can be easily adjusted to accommodate RFID backscatter link frequencies and frequency tolerances.

12 Claims, 16 Drawing Sheets

Related U.S. Application Data filed on Feb. 9, 2018, provisional application No. 62/594,278, filed on Dec. 4, 2017.

(58) Field of Classification Search
CPC ...... H04B 1/0003; H04B 1/38; H04B 1/3822; H04B 1/40; H04B 5/0037; H04B 5/0056
USPC ........................................................ 455/90.1
See application file for complete search history.

(56) References Cited

U.S. PATENT DOCUMENTS

| | | | |
|---|---|---|---|
| 6,930,564 | B2 | 8/2005 | Verspecht |
| 7,646,268 | B1 | 1/2010 | Tsironis |
| 8,013,715 | B2 | 9/2011 | Chiu et al. |
| 8,410,905 | B2 | 4/2013 | Song et al. |
| 9,900,060 | B1 | 2/2018 | Keehr |
| 2006/0098765 | A1 | 5/2006 | Thomas et al. |
| 2006/0238301 | A1* | 10/2006 | Wu ...................... G06K 7/0008 340/10.1 |
| 2007/0089513 | A1 | 4/2007 | Rosenau |
| 2009/0036082 | A1 | 2/2009 | Sajid |
| 2012/0083205 | A1* | 4/2012 | Marcu .................. G06K 7/0008 455/41.1 |
| 2012/0091820 | A1 | 4/2012 | Campanella |
| 2014/0248837 | A1 | 9/2014 | Zhou |
| 2015/0108210 | A1 | 4/2015 | Zhou |
| 2016/0112028 | A1 | 4/2016 | Baier |
| 2018/0323316 | A1* | 11/2018 | Konkapaka ............. H01L 29/93 |

OTHER PUBLICATIONS

Bae et al., "A Programmable Impedance Tuner With Finite SWRs for Load-Pull Measurement of Handset Power Amplifiers", IEEE Microwave and Wireless Components Letters, 2015, vol. 25, Issue 4.

Hogge, Jr., Charles, "A self correcting clock recovery circuit," IEEE Transactions on Electron Devices, Dec. 1985, vol. ED-32, No. 12, pp. 2704-2706.

Jung et al., "TX Leakage Cancellation via a Micro Controller and High TX-to-RX Isolations Covering a UHF RFID Frequency Band of 908-914MHz", IEEE Microwave and Wireless Components Letters, Oct. 2008, vol. 18, No. 10.

Klapproth et al., "A Programmable Load for Noise Characterization", ARFTG Conference Digest—Spring, 49th, 1997, vol. 31, pp. 155-160, DOI: 10.1109/ARFTG.1997.327224.

Koller et al., "Adaptive carrier suppression for UHF RFID using digitally tunable capacitors", Microwave Conference (EuMC), 2013 European, 2013, pp. 943-946.

Leake, B.W., "A Programmable Load for Power and Noise Characterization", Microwave Symposium Digest, 1982 IEEE MTT-S International, 1982, pp. 348-350, DOI:10.1109/MWSYM.1982.1130715.

Lee, T., "The Design of CMOS Radio-Frequency Integrated Circuits, Second Edition," Cambridge University Press, 2004, pp. 584-588.

Zobel, O.J., "Theory and Design of Uniform and Composite Electric Wave Filters", Bell Systems Technical Journal, 1923, vol. 2, pp. 1-46.

\* cited by examiner

Note: |•| is the magnitude operator

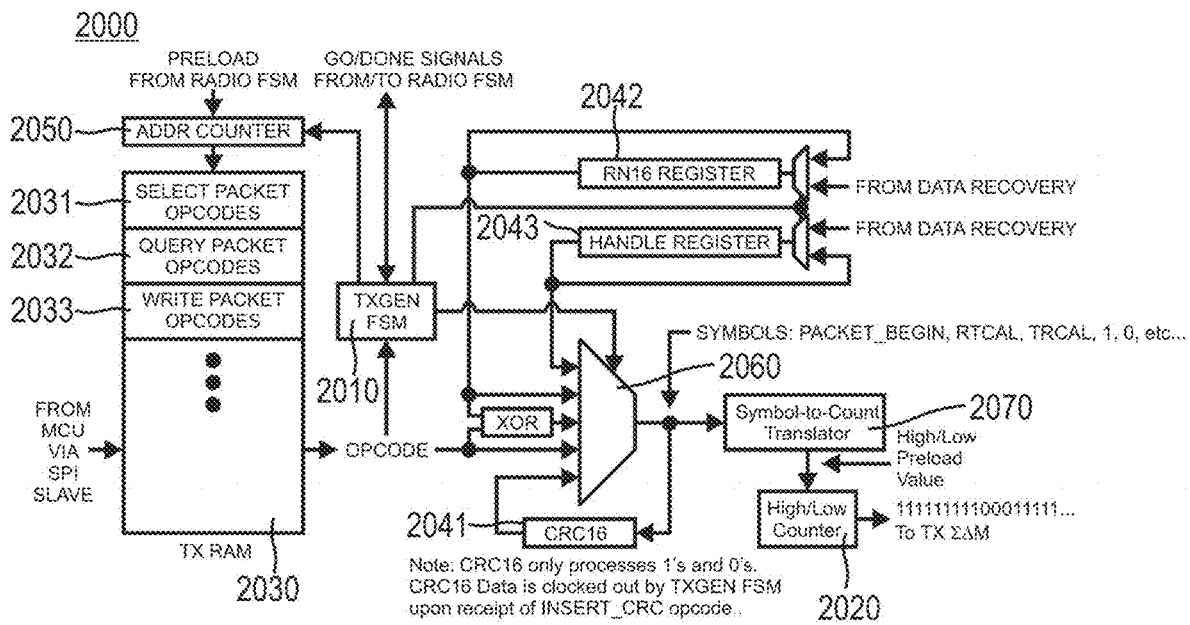

FIG. 20

| Opcode | Value | Explanation |
| --- | --- | --- |
| TXCW | 0000 | TX CW Tone for 1.8ms. |
| BEGIN SELECT | 0001 | Begin a select packet. |
| BEGIN REGULAR | 0010 | Begin a regular packet. |
| DUMMY ZERO | 0011 | Insert a zero, don't count it in CRC. |
| SINGLE ZERO | 0100 | Insert a zero, count towards CRC. |
| SINGLE ONE | 0101 | Insert a one, count towards CRC. |
| RTCAL | 0110 | Insert RTCAL. |
| TRCAL | 0111 | Insert TRCAL. |
| NAK END | 1000 | Provides short TX CW time after NAK. |
| XOR NEXT 16b | 1001 | XOR next 16b with RN16. |
| INSERT CRC | 1010 | Insert CRC. |
| INSERT RN16 | 1011 | Insert RN16. |
| INSERT HANDLE | 1100 | Insert Handle. |
| LAST WRITE | 1101 | Break write loop in Radio FSM. |
| END PACKET | 1110 | Return control to Radio FSM. |
| BEGIN IMMED | 1111 | Begin an immediate response packet. |

LOW-COST SOFTWARE-DEFINED RFID INTERROGATOR WITH ACTIVE TRANSMIT LEAKAGE CANCELLATION

PRIORITY INFORMATION

This application claims priority to and benefit of U.S. provisional patent application Ser. No. 62/594,278, titled "LOW-COST RFID READER WITH TRANSMIT SIGNAL CANCELLATION," filed Dec. 4, 2017, U.S. provisional patent application Ser. No. 62/628,289, titled "RFID DATA RECOVERY SYSTEM," filed Feb. 9, 2018, and U.S. provisional patent application Ser. No. 62/657,811, titled "A Low-Cost Software-Defined UHF RFID Reader with Active Transmit Leakage Cancellation and A Low-Cost, High-Speed, High Resolution Adaptively Tunable Microwave Network for an SDR RFID Reader Reflective Power Canceller," filed Apr. 15, 2018, all of which applications are incorporated herein by reference in their entirety for all purposes.

BACKGROUND

Field

This application relates to electronic transceivers, particularly in the context of radio frequency identification ("RFID") or microwave transceivers.

Description of the Related Art

RFID is a technology utilized widely within the shipping, retail, and various other industries. An RFID system can include one or more RFID tags and one or more RFID interrogator transceivers. The RFID tags can receive an electromagnetic signal (such as a radio signal) from an RFID interrogator transceiver, and that signal can cause the RFID tag to emit an electromagnetic signal at a substantially similar frequency as that of the RFID interrogator transceiver output signal, containing information encoded on the RFID tag. In some embodiments, the RFID tags can be passive RFID tags that are powered by the signal from the RFID interrogator transceiver, such that they do not need their own power source.

An example RFID tag contains a microchip and radio antenna encased in plastic. The RFID tag microchip contains special circuitry to extract energy from the incident electromagnetic waveform (e.g., from an RFID interrogator transceiver) and to use this energy to power the remainder of the RFID tag microchip. The RFID tag microchip contains a number of circuit blocks including a nonvolatile memory block which contains information regarding the item to which the RFID tag is affixed. Once the RFID tag microchip is powered up, the information residing in the nonvolatile memory block is often transmitted back to the RFID interrogator transceiver through a process known as backscattering. Backscattering occurs when the RFID tag modulates the termination impedance of its antenna(s), generating a reflected electromagnetic wave signal which the RFID interrogator transceiver can detect.

The signal emitted from the RFID tag can be received by the RFID interrogator transceiver. This information can then be used for a variety of purposes, such as to identify an item, locate an item, or provide general information.

Unfortunately, the information in the signal may be difficult to recover due to noise in the signal that can come from sources external to the transceiver, or sources internal to the transceiver. Similar problems can be found in other transceiver systems, operating at different frequencies, such as radio detection and ranging ("RADAR") systems.

SUMMARY

An example RFID system is depicted in FIG. 1. In a typical RFID system, an RFID tag 160 can be affixed to an item of interest. An RFID interrogator comprising an RFID interrogator transceiver 110 (or alternatively, separate transmitting and receiving elements) extracts information from the RFID tag 160 by transmitting a transmitter output signal T.S. from a transmitting element 120 through a coupling element 140 and through a radiating element 150. In FIG. 1, the coupling element 140 comprises a directional coupler 142 with a terminating element 145, although other coupling elements can also be used such as a hybrid coupler or a circulator. The radiating element 150 is depicted as a single antenna, although multiple antennas could also be used. The terminating element 145 is depicted as having a termination impedance of 50 Ohms, which for a 50 Ohm directional coupler ensures that signal reflections from port 3 of the directional coupler are substantially eliminated. The RFID tag 160 is energized by the large (for example, 0.1 W-2 W) transmitter output signal T.S. and backscatters a portion of the energy from the transmitter output signal T.S. back to the RFID interrogator as a tag returned signal R.S. The tag returned signal R.S. is received by the radiating element 150, passes through the coupling element 140, and is received by the input of receiving element 130. The receiving element 130 processes the tag returned signal R.S. such that the relevant information therein can be suitably decoded by a subsequent system or by the receiving element itself. Using such a system, the RFID interrogator can extract information from the tag returned signal R.S. For example, the RFID interrogator can extract information stored on the RFID tag (e.g., in the form of bits), such as information regarding the object to which RFID tag 160 is attached. Furthermore, the waveform characteristics present in tag returned signal R.S. can provide information regarding the distance of RFID tag 160 to the RFID interrogator, information regarding the position in space of RFID tag 160, or other information.

RFID interrogators can be designed with a single radiating element such as radiating element 150 in FIG. 1. Said radiating element can be coupled to both the transmitting element 120 and receiving element 130 in such a way as to substantially isolate the input of the receiving element 130 from the effects of the transmitter output signal T.S. However, because of the finite reflection coefficient of the radiating element 150, some of transmitter output signal T.S. is reflected back into the input of the receiving element 130 as transmit reflection signal F.S. Along with transmit reflection signal F.S., a transmit leakage signal (from the transmitter output signal T.S. leaking through the coupling element 140) and other effects can result in substantial energy from the transmitter output signal T.S. appearing at the receiving element input. This energy can then cause errors in decoding the information contained in the tag backscatter signal that would be absent in the case where no transmit signal energy were present at the receiving element input.

Corruption of the tag returned signal R.S. is depicted in FIG. 2, in which the frequency domain plot 210 depicts the transmitter output signal T.S. as a double-sided power spectral density with negative and positive frequency components 211a and 211b centered at frequencies $-f_T$ and $+f_T$, respectively. Note that this plot can also be generalized to represent the transmitter signal at baseband if, for example, $f_T$ is set to equal 0 in the case of a direct conversion transceiver, in which case negative and positive frequency components 211a and 211b coincide and are both centered at the zero frequency. On the other hand, when transmitted over the air to the RFID tag, $f_T$ may be equal to a frequency substantially similar to 900 MHz. Each of the positive and negative frequency components 211a and 211b can include a central lobe relating to amplitude modulation signaling, and side skirts relating to phase noise and other noise signals. Frequency domain plot 220 depicts the tag returned signal R.S. as being comprised of tag backscatter modulation components 221-222 and 223-224, with each modulation component separated from $+f_T$ or $-f_T$ by an offset frequency $f_R$. Although the tag returned signal may also contain components similar to T.S., the tag information of interest can primarily reside in backscatter modulation components 221-224, which are shown by themselves for the sake of simplicity. Frequency domain plot 230 depicts the signal at the input of the receiver element. Transmit reflection signal F.S. components 231a and 231b can be considerably larger than tag backscatter modulation components 232-235. The transmit leakage signal coupled from other locations in the system is not depicted in frequency domain plot 230 because it is substantially similar to transmit reflection signal F.S. components 231a and 231b with the potential notable exceptions of phase and amplitude deviations.

Also depicted in frequency domain plot 230 are bandpass filter masks 236-239 which represent bandpass filtering that can take place in receiving element 130 or elsewhere prior to the final bit decision. The bandpass filters represented by masks 236-239 attenuate nonessential portions of the receiving element input signal on a frequency-selective basis (or other bases), leaving a signal with a frequency domain plot 240, for example.

In the frequency domain plot 240, the tag backscatter modulation components 241-244 are still present, but are rivaled in total power by the residual energy components 245-248 from the transmit reflection signal F.S. If the residual energy components 245-248 are too large relative to the tag backscatter modulation components 241-244, then the rate of errors in decoding the information contained in the tag backscatter signal can become unacceptably high. Because the residual energy from the transmit reflection signal and other transmit signal components at the receiving element input is proportional to the total transmit signal energy at the receiving element input, it may be desirable to substantially reduce the transmit signal components at the receiving element input. Doing so can permit successful demodulation of the tag backscatter information in the presence of lower tag backscatter energy than otherwise, allowing, for example, a greater operational range between the RFID tag and interrogator. Thus, it can be desirable to provide a transmit leakage cancellation circuit which enables an RFID interrogator transceiver to substantially reduce the transmit signal energy at the receiving element input.

BRIEF DESCRIPTION OF THE DRAWINGS

For a more complete understanding of the devices and methods described herein, reference is made to the following description and accompanying drawings, in which:

FIG. 20 is a schematic of an embodiment of a transmit baseband waveform generator for use in an RFID interrogator transmitter;

FIG. 21 is a table showing the opcodes used in an embodiment of a transmit baseband waveform generator for use in an RFID interrogator transmitter.

DETAILED DESCRIPTION

Figure 3:
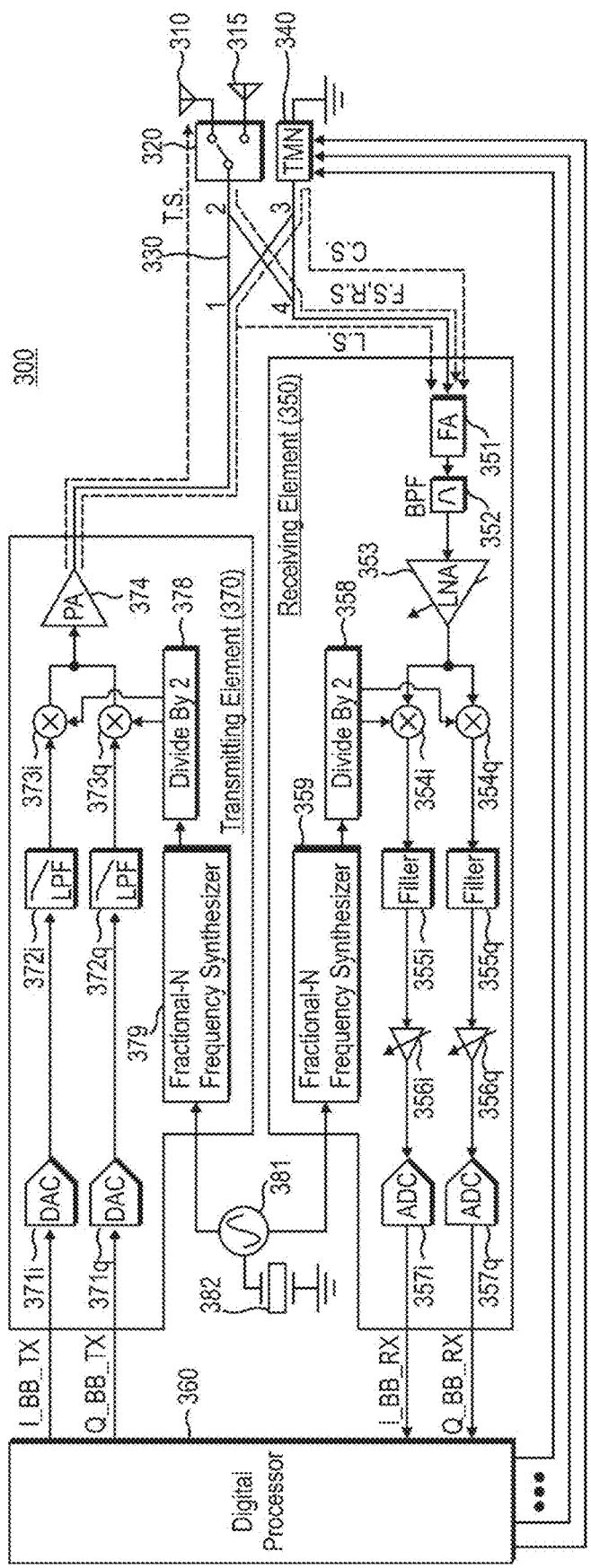
FIG. 3 is a block diagram of a RFID interrogator transceiver employing a tunable microwave network at the coupling port of a differential coupler.

A block diagram of a RFID interrogator transceiver 300 is depicted in FIG. 3. In this embodiment, the radiating element is comprised of multiple antennas 310 and 315, and an RF switch 320. Such an arrangement, here considered to be a single radiating element, is more general than a single antenna and can permit interrogation of RFID tags in two orthogonal spatial orientations. A single antenna or more than two antennas are also possible.

The single pole of RF switch 320 is coupled to a directional coupler 330. The directional coupler 330 has four ports, numbered 1 to 4. The directional coupler can be a microwave device that can include two coupled transmission lines: a first transmission line from port 1 to port 2, and a second transmission line from port 3 to port 4, although other designs and components are also possible. Further, although many components are described as microwave components, in other embodiments they can be configured to operate with other frequencies.

The diagonal lines from port 2 to port 4 and from port 1 to port 3 reflect the coupling aspect of the directional coupler, where a defined portion of microwave energy from port 1 is coupled to port 3 (and vice versa) and a defined portion of microwave energy from port 2 is coupled to port 4 (and vice versa). In FIG. 3, port 1 is termed the input port, where transmit power is applied. Port 2 is the transmitted port, to which the majority of the power delivered to the input port is coupled. The radiating element is connected to port 2, potentially minimizing the loss between the transmitting element and the radiating element. Port 3 is commonly called the coupled port, and is the port to which a defined amount of energy from the input port is coupled. Port 4 is commonly called the isolated port, with its nomenclature referring to the fact this port is substantially isolated from the input port, provided that port 3 is terminated in a microwave load matched to the second directional coupler transmission line. It should be evident to the interrogator that ports 2 through 4 are all defined with respect to port 1. If port 2 were deemed the input port, then port 4 could be deemed the coupled port. This symmetric nature of the directional coupler facilitates its use as a device to couple both the transmitting element and the receiving element to the radiating element.

Figure 1:
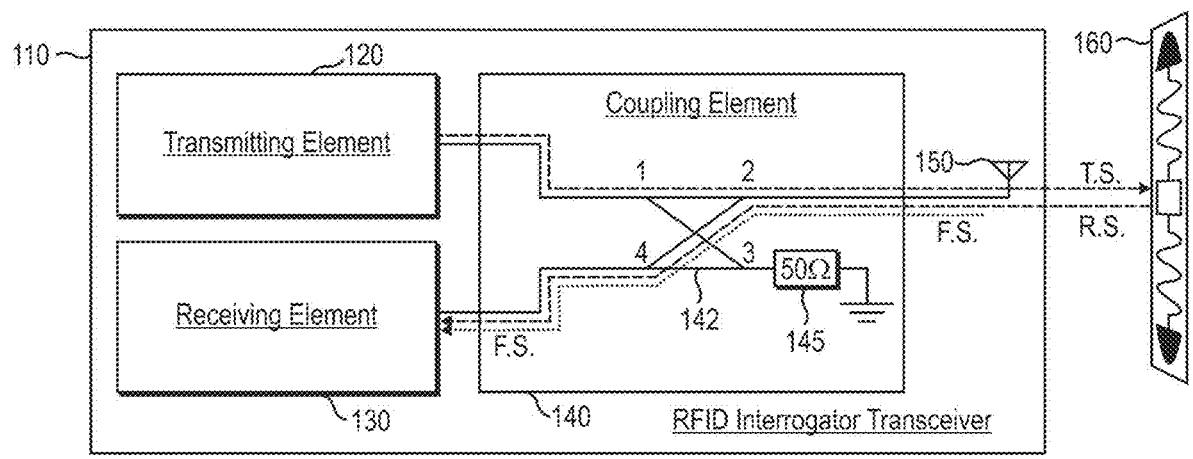
FIG. 1 is a block diagram of a RFID interrogator transceiver.

In order to substantially reduce the transmit signal energy at the input of the receiving element 350, the terminating element 145 from FIG. 1 with static termination impedance of 50 Ohms can optionally be replaced with a tunable microwave network 340, as shown in FIG. 3. A digital processor 360 adjusts the reflection coefficient of the tunable microwave network 340 away from a nominal value of zero, such that signal reflections from port 3 of the directional coupler 330 are not substantially eliminated and are in fact manipulated in order to provide a transmit cancellation signal C.S. which is substantially equal in magnitude and substantially opposite in phase to the vector sum of transmit reflection signal F.S., transmit leakage signal L.S., and any other transmit signal coupled to the input of receiving element 350. When the transmit cancellation signal C.S. is therefore combined with the vector sum of transmit reflection signal F.S., transmit leakage signal L.S., and any other transmit signal coupled to the input of receiving element 350, the transmit signal energy at the input of the receiving element is substantially reduced relative to the case in which C.S. were not present.

The digital processor 360 also generates digital baseband waveforms I_BB_TX and Q_BB_TX containing complex baseband envelope information of the transmit output signal and provides these waveforms to the transmitting element 370. Digital-to-analog converters (DACs) 371*i* and 371*q* convert digital baseband waveforms to analog baseband waveforms. Low-pass filters 372*i* and 372*q* receive the analog baseband waveforms and substantially attenuate undesirable baseband signal content above a frequency band of interest relative to the desirable portion of the transmit output signal. The filtered analog baseband transmit waveform is then upconverted to microwave frequencies by quadrature mixers 373*i* and 373*q*, which each receive as an input one of an in-phase or quadrature baseband transmit signal. Each of the quadrature mixers 373*i* and 373*q* also receive as an input one of an in-phase or quadrature (approximately 90 degrees phase offset from in-phase) local oscillator signal, further described below. Combining the outputs of mixers 373*i* and 373*q* yields a complex modulated radio frequency signal that couples to a power amplifier 374. The power amplifier 374, which may be itself composed of one or more amplifiers, outputs a transmit output signal at high power (for example, approximately 0.1 W to 4 W) so that the RFID tag targeted by the RFID interrogator transceiver 300 receives enough energy to power itself and conduct operations at a predetermined distance from the RFID interrogator transceiver (for example, approximately 1 to 10 meters). As mentioned before, power amplifier 374 is coupled to port 1 of directional coupler 330.

After coupling to the receiving element 350, the receiving input signal passes through a fixed attenuator (FA) 351 and a bandpass filter (BPF) 352. The fixed attenuator 351 can be used to assure that F.S. and L.S. do not exceed the maximum input power limit of the receiving element low noise amplifier (LNA) 353, even when the digital processor 360 has not properly configured the tunable microwave network 340 for substantial transmit signal cancellation, for example. The bandpass filter 352 can be used to substantially attenuate signal content outside of the range of frequencies substantially processed by the RFID interrogator transceiver relative to desired signal content, therefore improving the signal-to-interference ratio of the desired signal. The output of the bandpass filter 352 is coupled to the input of LNA 353.

Figure 2:
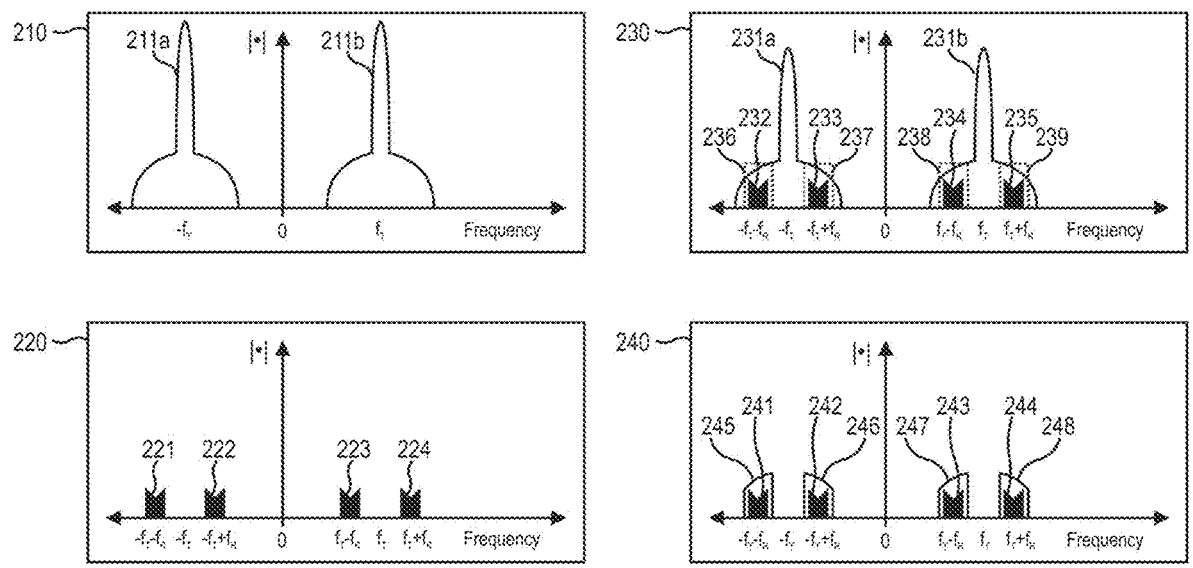
FIG. 2 is a set of frequency domain plots that can result from the transceiver of FIG. 1.

The LNA 353 can have adjustable gain and may be bypassable in the case where the expected receive input signal has an amplitude large enough so as to not warrant amplification. Usually, the purpose of an LNA in a receiving element is to amplify the signal so as to minimize the input-referred noise contribution of the following circuit blocks. The receive signal is downconverted by quadrature mixers 354*i* and 354*q*, each of which also receives as an input one of an in-phase or quadrature (approximately 90 degrees phase offset from in-phase) local oscillator signal (further described, below). The local oscillator signals utilized in the receiving element can cycle at approximately the same frequency as do those in the transmitting element 370, discussed above, and can further originate from the same source. The reason for this arrangement is because the receive signal content can be substantially centered around the center frequency $f_T$ of the transmit signal, as depicted in plot 220 of FIG. 2.

Downconverting the receive signal by $f_T$ can move the tag backscatter modulation components of the receive signal to low-intermediate frequencies (low-IF), which can be substantially higher than zero-frequency (DC) offsets and low frequency 1/f noise common in many types of circuits, but also low enough to be easily digitized by moderate-bandwidth analog-to-digital converters of moderate cost (such as those with a sample rate of 32-36 MHz). The received analog baseband signals then pass through filters 355*i* and 355*q*. The filters 355*i* and 355*q* can be configured to reject both high and low frequency components. Low frequency components that are filtered-out can include significant portions of the downconverted transmit reflection signal and aforementioned 1/f noise. High frequency components that are filtered-out can include RFID signals from other RFID interrogators and other transmitters operating in the same frequency band as RFID interrogators. The outputs of the filters 355*i* and 355*q* are coupled to programmable gain amplifiers 356*i* and 356*q*, which are in turn coupled to quadrature analog-to-digital converters (ADCs) 357*i* and 357*q*. The ADCs 357*i* and 357*q* provide digital baseband receive waveforms I_BB_RX and Q_BB_RX to the digital processor 360. The digital processor 360 can then demodulate the digital baseband receive signal in an attempt to recover information, such as a packet of bits, backscattered by the RFID tag.

The quadrature local oscillator signals utilized in both receiving element 350 and transmitting element 370, as discussed above, are generated from a frequency synthesis network comprising transmit divide-by-2 circuit 378, transmit fractional-N frequency synthesizer 379, receive divide-by-2 circuit 358, receive fractional-N frequency synthesizer 359, common reference oscillator 381, and common frequency reference crystal 382. The frequency reference crystal 382 is often a small piece of quartz and is designed to resonate at a specific frequency, such as one between 1 MHz-50 MHz. The reference oscillator 381 drives frequency reference crystal 382 to generate a reference oscillator signal that substantially consists of frequency content at a single frequency within the specified frequency range of the reference crystal. The output of the reference oscillator 381 is coupled to one or more frequency synthesizers, which can optionally be fractional-N in nature. The frequency synthesizers can perform an accurate multiplication of the reference oscillator frequency. The typical quartz reference crystal frequencies range from 1 MHz-50 MHz but a substantial portion of portable RF transceivers such as RFID interrogators utilize local oscillator frequencies of 300-6000 MHz. Thus, this multiplication can be helpful. The multiplication can be integer-N in nature, meaning that the ratio of the local oscillator signal to the reference oscillator signal is substantially an integer, or it can be fractional-N in nature, meaning that the ratio of the local oscillator signal to the reference oscillator signal is substantially similar to a defined fraction. In FIG. 3, the outputs of the fractional-N frequency synthesizers 359 and 379 couple to the divide-by-2 circuits 358 and 378, respectively. As such, the output frequency of the fractional-N frequency synthesizer is substantially similar to twice the local oscillator frequency. This arrangement can permit the use of a higher quality frequency synthesizer oscillator, result in less local oscillator signal coupling to mixer signal inputs, and impose less demanding signal routing requirements relative to the case in which local oscillator signals are generated from the frequency synthesizers directly. Finally, the divide-by-2 circuits provide quadrature local oscillator signals to the mixers in both the transmitting element and the receiving element.

Figure 4:
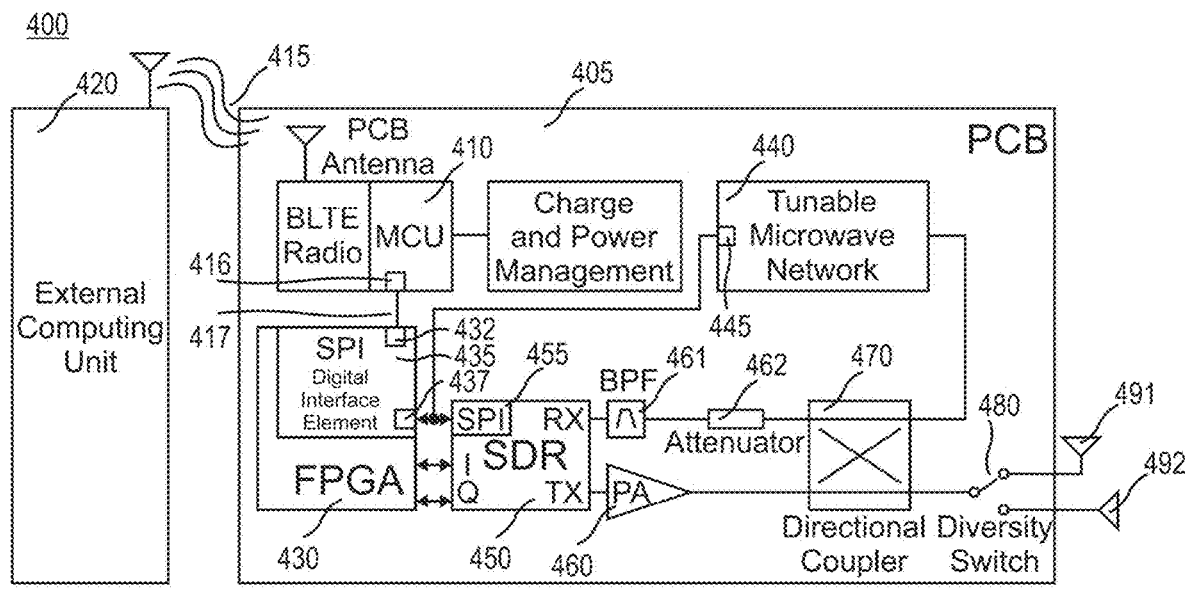
FIG. 4 is a schematic of an embodiment RFID interrogator transceiver top level architecture.

FIG. 4 depicts an embodiment of an RFID interrogator top level architecture 400 to be implemented on a printed circuit board (PCB) 405. In this embodiment, the functions of the digital processor are split between a microcontroller unit (MCU) 410, an external computing unit 420 connected to the MCU 410 through a Bluetooth Low-Energy (BTLE) wireless link 415, and a field-programmable gate array (FPGA) 430. Each of MCU 410, external computing unit 420, and FPGA 430 can be thought of as a subsidiary digital processor, which, when combined with the other subsidiary digital processors, realizes a complete digital processor. FPGA 430 can actuate tunable microwave network 440 and can program software-defined radio transceiver (SDR) 450. Both tunable microwave network 440 and SDR 450 may comprise circuit elements or application-specific integrated circuits, each of the circuit elements themselves comprising digital control interfaces through which a digital processor may control the circuit elements. SDR 450 may comprise a transmitting element similar to transmitting element 370, a receiving element similar to receiving element 350, and a reference oscillator similar to reference oscillator 381. The transmitting element of SDR 450 drives a power amplifier (PA) 460 which is, in turn, operatively coupled to directional coupler 470, which is in turn operatively coupled to diversity switch 480 and antennas 491 and 492. The receiving element of SDR 450 couples to directional coupler 470 through an attenuator 462 and a bandpass filter 461.

In some embodiments, it is preferred to use an MCU with a low pin count or with few peripherals to minimize cost and PCB area. In this case, the MCU may have limited communication channels to other modules on the board. In one common case, the MCU may have only one digital control interface 416. Digital control interfaces may comprise one or more serial peripheral interfaces (SPI), one or more inter-integrated circuit (I2C) buses, one or more parallel digital ports, or many other options. Digital control interfaces may operate as a master or slave interface, or may operate as both at different times. Other circuit elements on PCB 450 will also often comprise digital control interfaces. For example, FPGA 430 comprises digital control interfaces 432 and 437. SDR 450 comprises digital control interface 455. Tunable microwave network 440 comprises digital control interface 445. For the example case of RFID interrogator architecture 400, all of the digital control interfaces will operate according to an SPI protocol. In order to solve the problem of a limited number of digital control interfaces on the MCU, the embodiment architecture 400 realizes a serial peripheral interface (SPI) digital interface element 435 within FPGA 430 that allows MCU 410 to communicate with tunable microwave network 440 and SDR 450 through FPGA 430 without requiring more than the one SPI connection 417 needed to communicate between MCU 410 and FPGA 430. The SPI digital interface element 435 also offers the advantage that both MCU 410 and FPGA 430 can actuate tunable microwave network 440 and SDR 450 at different times without requiring dedicated multiplexing circuitry on the PCB. For example, it may be advantageous for MCU 410 to set a default state of digital registers on the SDR prior to commencing a sequence of radio operations in quick succession, during which it may be more advantageous for FPGA 430 to have the ability to set digital register values on the SDR. It can also be advantageous to split the RFID interrogator transceiver digital processor burden as depicted in top level architecture 400 due to the fact that low-cost MCUs often cannot operate at high speeds with low latency, abilities that a low-cost FPGA often has. Furthermore, a low cost top level architecture 400 may not have room for a user interface, which many contemporary external computing units will have (e.g. a smartphone). Hence, MCU 410 sends data back and forth to external computing unit 420 over wireless link 415. The ability of MCU 410 to wirelessly connect to computing unit 420 over wireless link 415 also may provide the option to reprogram both MCU 410 and FPGA 430 with updated firmware after, for example, an initial customer purchase.

Figure 5:
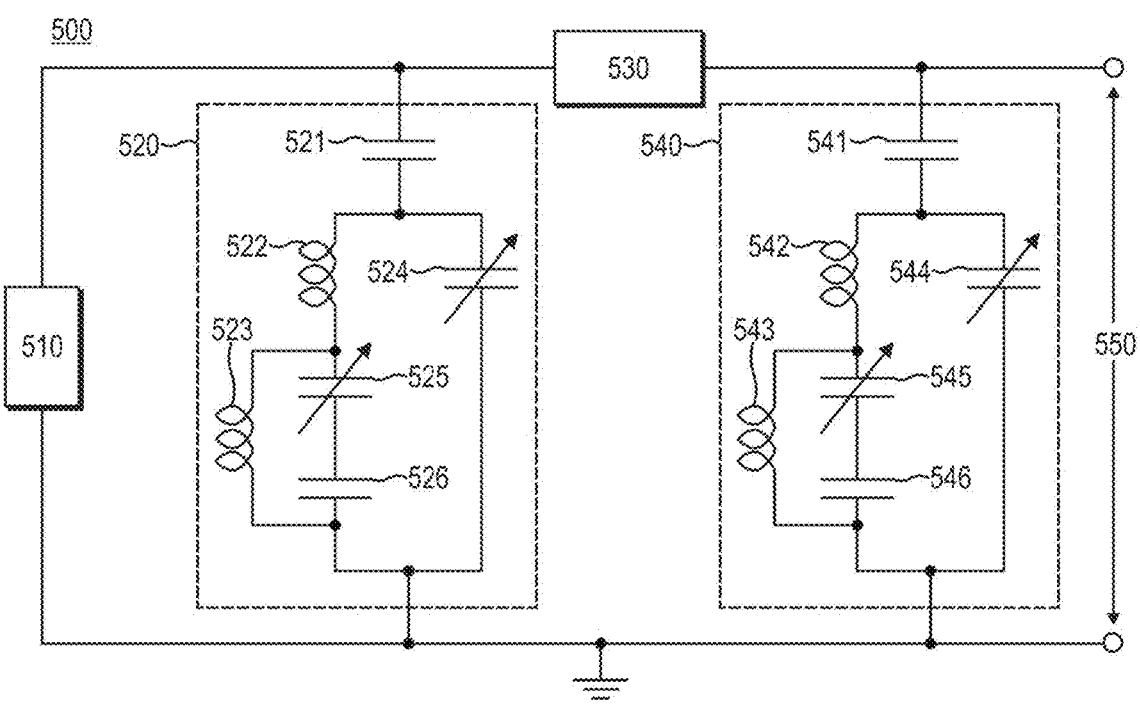
FIG. 5 is a schematic of an embodiment tunable microwave network.

FIG. 5 depicts an embodiment of a tunable microwave network 500 suitable for use in the system of FIG. 4. The design goal of this tunable microwave network 500 is for it to realize at a port 550 any reflection coefficient within a set of desirable reflection coefficients that will provide for substantial attenuation of transmit signal energy at a receiving element input, such as that shown at the RX terminal of SDR 450 in FIG. 4. In the case where the tunable microwave network can only realize a discrete set of reflection coefficients, one design goal is that the maximum geometric distance from any point within the set of desirable reflection coefficients to the nearest point within the discrete set of realizable reflection coefficients be minimized. This distance will be referred to herein as the maximum error distance. In one embodiment, the set of desirable reflection coefficients can be all of those reflection coefficients within a predetermined geometric distance from a predetermined reflection coefficient. In another embodiment, the predetermined reflection coefficient can be zero, and the set of desirable reflection coefficients can be all those reflection coefficients with magnitude below a predetermined quantity. It should be apparent that for a given cost and maximum error distance, a circuit which can realize a larger set of reflection coefficients than another circuit is a superior circuit. Similarly, for a given cost and set of desirable reflection coefficients, a circuit which can achieve a lower maximum error distance than another circuit is a superior circuit. For large values of antenna reflection coefficients, such as in the case of low quality, low cost antennas, the transmit reflection signal F.S. from FIG. 3 can significantly exceed other components of the transmitter output signal at the receiving element input. In such a case, a possible target set of desirable reflection coefficients to be realized by the tunable microwave network is the set of all reflection coefficients with magnitude less than the magnitude of the maximum reflection coefficient of the radiating element. For a large and useful class of radiating elements, the maximum reflection coefficient can be 0.3, or expressed in decibels, −10 dB.

From left to right, the example tunable microwave network includes an optional load network 510. In one embodiment, this load network may simply be a resistor. In another embodiment, this load network may be a resistor in series with a transmission line. In yet another embodiment, this load network may be a resistor in series with an inductor. Next, a first tunable capacitive element 520 is employed in a shunt configuration between phase shifting element 530 and ground. In the embodiment depicted in FIG. 5, first tunable capacitive element 520 consists of a coarse tunable capacitive element 524, an inductive divider consisting of inductors 522 and 523, a fine tunable capacitive element 525, a fixed resonating capacitive element 526 and a fixed impedance limiting capacitive element 521. Either or both of the coarse tunable capacitive element 524 and the fine tunable capacitive element 525 can be implemented by, or comprise, digitally tunable capacitors. As explained further below in connection with FIG. 5, the impedance of the fine tunable capacitive element 525 is transformed upwards (i.e. the apparent capacitance is made smaller) by the inductive divider consisting of inductors 522 and 523. Once transformed in this fashion and placed in parallel with coarse tunable capacitive element 524, the fine tunable capacitive element can serve as a subranging capacitive element relative to the coarse tunable capacitive element 524. In other words, the coarse tunable capacitive element 524 can make large changes, while the fine tunable capacitive element 525 can make smaller changes, in between values that would be realizable with just the coarse tunable capacitive element. In such an embodiment, the resolution of capacitance values realizable by the first tunable capacitive element 520 can far exceed the resolution of capacitance values realizable by the coarse tunable capacitive element 524 alone. The advantage of this increased resolution is that it makes possible the reduction of maximum error distance below the case in which fine tunable capacitive element 525 does not exist.

In order to create this subranging effect, many transformation techniques may be applied to the fine tunable capacitive element 525 in place of the inductive divider. For example, an inductive transformer may also be utilized for this purpose. In both the cases of an inductive divider and inductive transformer, a residual series inductance appears in series with the fine tunable capacitive element in the equivalent transformed network. This residual series inductance can be substantially resonated out of the network at a predetermined frequency of operation of the network in order for the subranging effect to operate in an intuitive manner. The fixed resonating capacitive element 526 can resonate out this residual series inductance. Further, the fixed impedance limiting capacitive element 521 can limit the minimum shunt impedance of the first tunable capacitive element 520. By doing so, it was found that the set of realizable reflection coefficients could be better confined to a particular predetermined area in the complex reflection coefficient plane, hereafter denoted as the $\Gamma$-plane, thus reducing the maximum error distance within this particular predetermined area.

Continuing left to right in FIG. 5, the first tunable capacitive element 520 is coupled to phase shifting element 530, which is in turn coupled to a second tunable capacitive element 540 which, like the first tunable capacitive element 520, is also employed in a shunt configuration. In the depicted embodiment, the architecture of the second tunable capacitive element 540 is substantially similar to that of the first tunable capacitive element 520, but can contain different component values. One effect of the phase shifting element 530 between the two tunable capacitive elements is to provide a degree of orthogonality between the curves traced in the $\Gamma$-plane by tuning the capacitances of tunable capacitive elements 520 and 540. As such, an appropriate phase shift for the phase shifting element 530 can be between 15 degrees and 60 degrees. Such a phase shift roughly results in a clockwise rotation of 30 degrees to 120 degrees of the realized reflection coefficients in the $\Gamma$-plane, as microwave signals reflected through the tunable microwave network experience this phase shift twice. Although geometric orthogonality is often considered to result from a 90 degree phase shift, in the present context the relevant orthogonality is that between rotated arcs traced out by sweeping the tunable capacitive elements in the $\Gamma$-plane, as will be described more fully later. In one embodiment, the phase shifting element 530 can include a transmission line. In another embodiment, the phase shifting element 530 can include a lumped transmission line or subsection thereof. In yet another embodiment, the phase shifting element 530 can include an inductor disposed in series between the two tunable capacitive elements. Note that in this latter case, the inductor, combined with any shunt capacitance to ground at either of its two terminals, can be considered a subsection of a lumped transmission line. In further embodiments, combinations of these phase shifting elements can be used.

Figure 6:
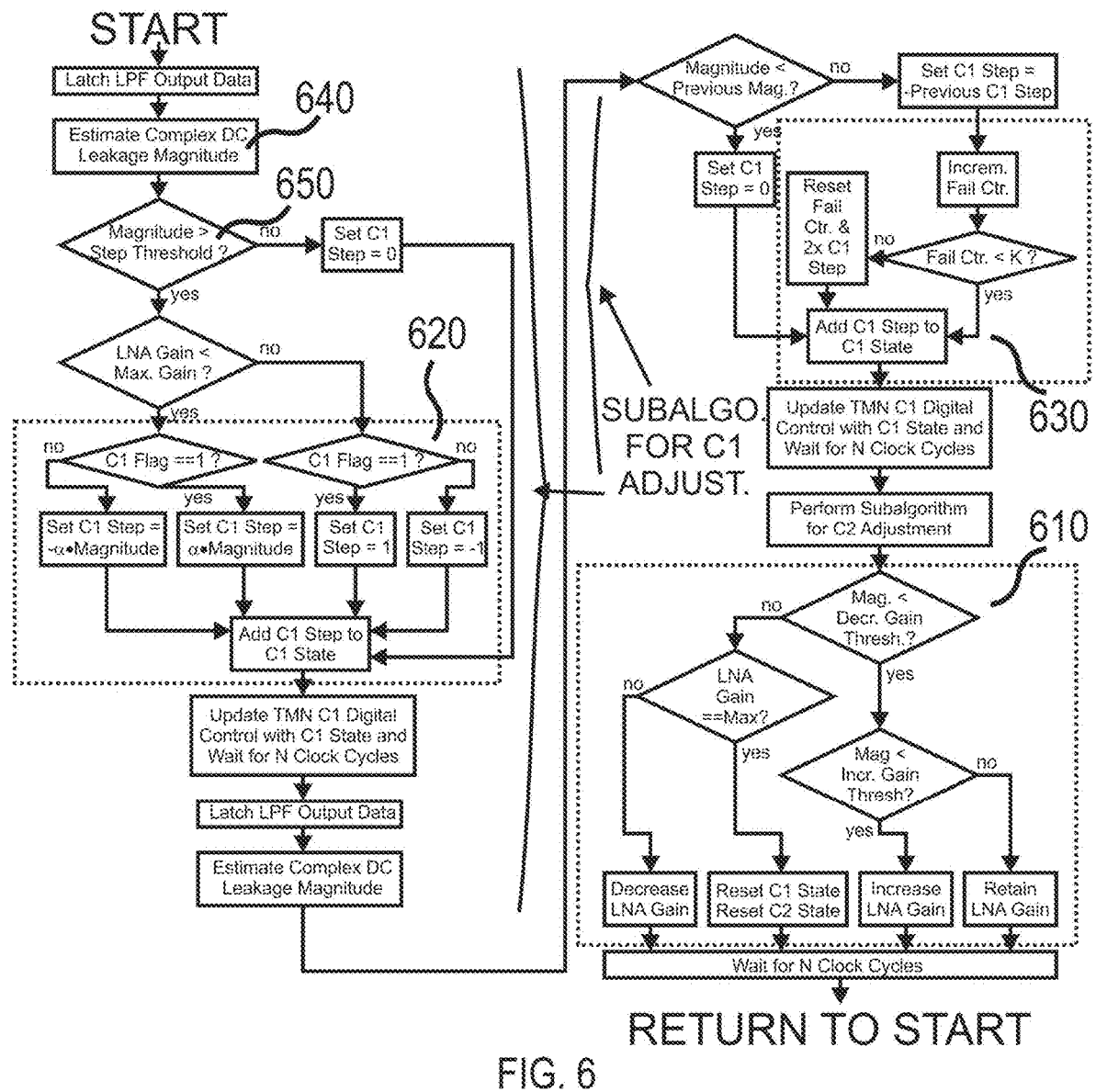
FIG. 6 is a flow chart of an embodiment digital algorithm for actuating the tunable microwave network in FIG. 5.

FIG. 6 is a flow chart depicting a tuning algorithm 600 for use in actuating tunable microwave network 500. In algorithm 600, C1 can be considered to be first tunable capacitive element 520 and C2 can be considered to be second tunable capacitive element 540. Algorithm 600 is fully blind, and uses independent changes in the first and second tunable capacitive elements to effectively compute the local gradient of the transmit leakage (the vector sum of L.S., R.S., and C.S. in FIG. 3) as a function of the two tunable capacitive elements. Algorithm 600 uses knowledge of this local gradient to actuate the two tunable capacitive elements 520 and 540 in such a way as to minimize this leakage. Tuning algorithm 600 is implemented at digital baseband and operates on signals near-0-Hz (i.e. DC signals). This choice is made because in the top level architecture 400, SDR 450 is a direct-conversion transceiver. Therefore, the transmit leakage appears at the downconversion frequency of the receiving element of SDR 450 and is downconverted to near-DC (and DC) frequencies. The signal content at these near-DC frequencies is used as a proxy for the actual transmit leakage appearing at the receiving element input of SDR 450. In the implementation shown in architecture 400, tuning algorithm 600 is implemented within FPGA 430. Equivalently, tuning algorithm 600 is intended for implementation with the digital processor 360 of RFID interrogator transceiver 300.

One key issue that can occur in systems such as RFID interrogator transceiver 300 is that the transmit leakage at the receiving element 350 input can easily saturate receiving element 350 at the gains required to demodulate an RFID tag returned signal R.S at range. Therefore, tuning algorithm 600 can progressively actuate the receiving element gain such that the receiving element does not operate in a saturated state for a problematically long period of time. The flowchart decisions controlling this actuation are depicted in the flowchart element group 610. Tuning algorithm 600 may estimate the magnitude of the transmit leakage at the receiving element input at flowchart element 640 using the approximation max(DC(I_BB_RX), DC(Q_BB_RX))+($\frac{1}{4}$)*min(DC(I_BB_RX), DC(Q_BB_RX)) right bit shifted by a number of bits commensurate with the current receiving element gain, where DC( ) is an operator which outputs only the absolute value of the near-DC signal content of the operator argument. If this transmit leakage estimate is greater than a predetermined level, for example, about −50 dBm, at the receiving element input, the algorithm can be made to execute, as depicted in flowchart element 650. If not, the algorithm and all SPI communications from FPGA 430 to tunable microwave network 440 and SDR 450 can be made to shut down to avoid chatter and glitching which can couple to the receiving element input, raising the noise floor and preventing demodulation of the tag returned signal R.S. If the receiving element gain is less than its maximum, the steps taken by the algorithm can be proportional to the transmit leakage magnitude estimate. If the receiving element gain is at its maximum, the tunable capacitive elements can be only incremented and decremented by 1 to ensure that any exploratory steps taken do not result in transmit leakage saturating the receiver.

Flags corresponding to the two tunable capacitive elements can be used to store the signals of the roughly orthogonal components of the local gradient of the transmit leakage. Functionally, these flags control whether the two capacitive elements are incremented or decremented on each step. If the algorithm sees that the transmit leakage magnitude is decreasing on each iteration, the flags can be kept constant. If the transmit leakage magnitude increases on any step, the previous step may be reversed and the relevant tunable capacitive element flag may be flipped (in flowchart element group 620) so that the corresponding capacitive element is actuated in the opposite direction on the next algorithmic interval. Also, if the transmit leakage magnitude increases on any step, a "fail counter" may increment. When the "fail counter" reaches a high enough value, indicating that the algorithm may be trapped in a local minimum, the next step value may be temporarily doubled in an attempt to escape the local minimum. The "fail counter" may be reset to zero at any one of these doublings, or when the transmit leakage magnitude decreases. This "fail counter" behavior is captured in flowchart element group 630.

After actuating the tunable capacitive elements, the transmit leakage magnitude may be compared (in flowchart step group 610) against a set of thresholds which dictate whether the receiving element gain will be changed on the next algorithm iteration. If the transmit leakage magnitude is too high and the receiving element gain is at its minimum, the tunable capacitive elements may be reset in order to bound the transmit leakage level to avoid ever saturating or damaging the receiving element.

Figure 7:
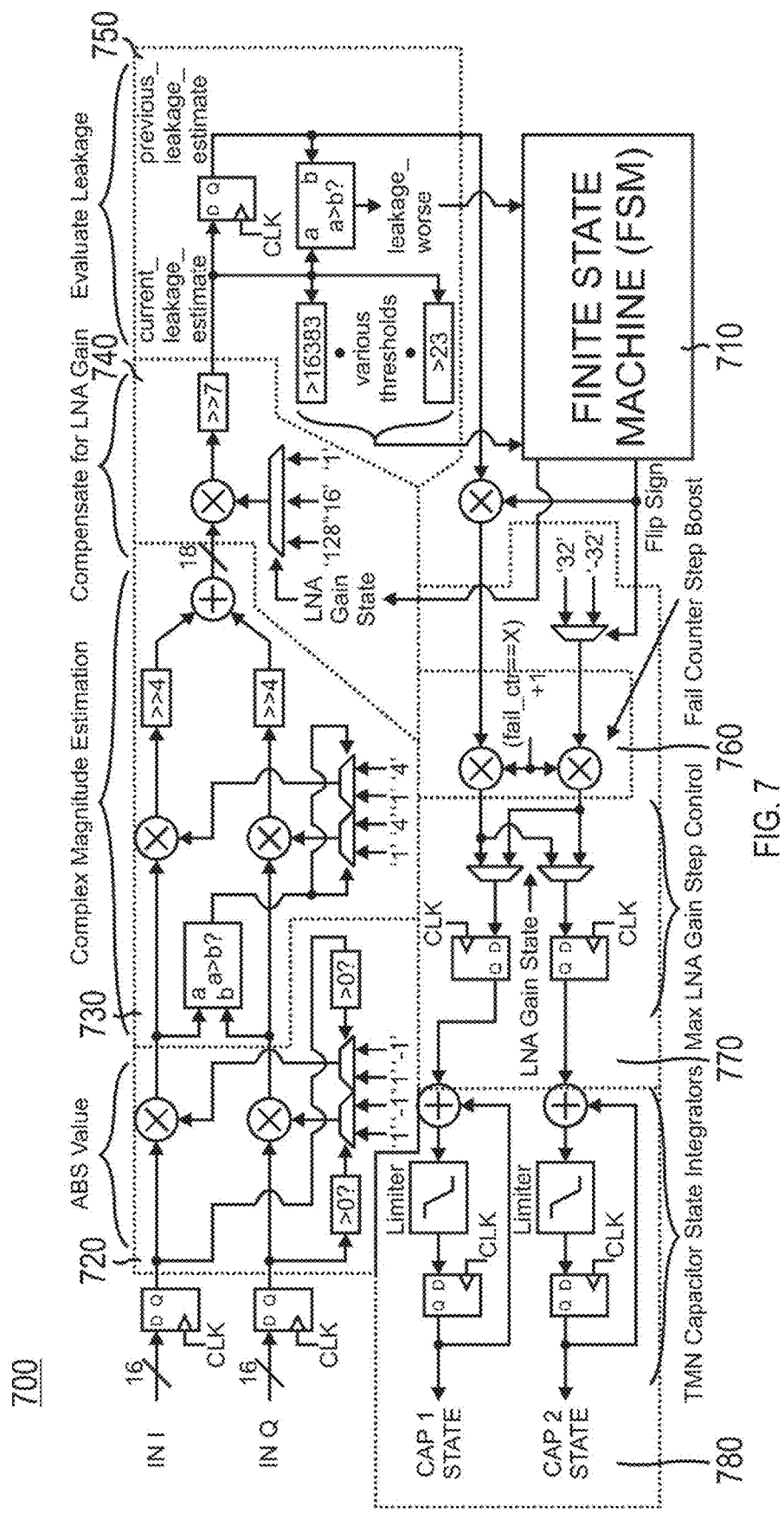
FIG. 7 is a schematic of an embodiment implementation of the tunable microwave network actuation digital algorithm in FIG. 6.

Digital hardware implementation 700 shown in FIG. 7 is a depiction of an embodiment of a digital hardware implementation of tuning algorithm 600. The algorithm is controlled by a finite state machine (FSM) 710. The transmit leakage magnitude estimation is broken up into hardware groups 720 and 730, which respectively handle taking an absolute (ABS) value and performing the comparisons and additions in the relation: max(DC(I_BB_RX), DC(Q_BB_RX))+($\frac{1}{4}$)*min(DC(I_BB_RX), DC(Q_BB_RX)). Adjusting the receiving element (alternatively LNA (low noise amplifier)) gain for the purposes of transmit leakage magnitude evaluation is handled in hardware group 740, while a determination on whether the transmit leakage got better or worse on the latest algorithmic step is handled in hardware group 750. The "fail counter" multiplier is implemented in hardware group 760. Adjustment of the tunable capacitive element algorithmic step as a function of receiving element (alternatively, LNA) gain is handled in hardware group 770, while integration of the algorithmic steps and tunable capacitive element (alternatively, TMN capacitors) state storage and limiting takes place in hardware group 780.

Figure 8:
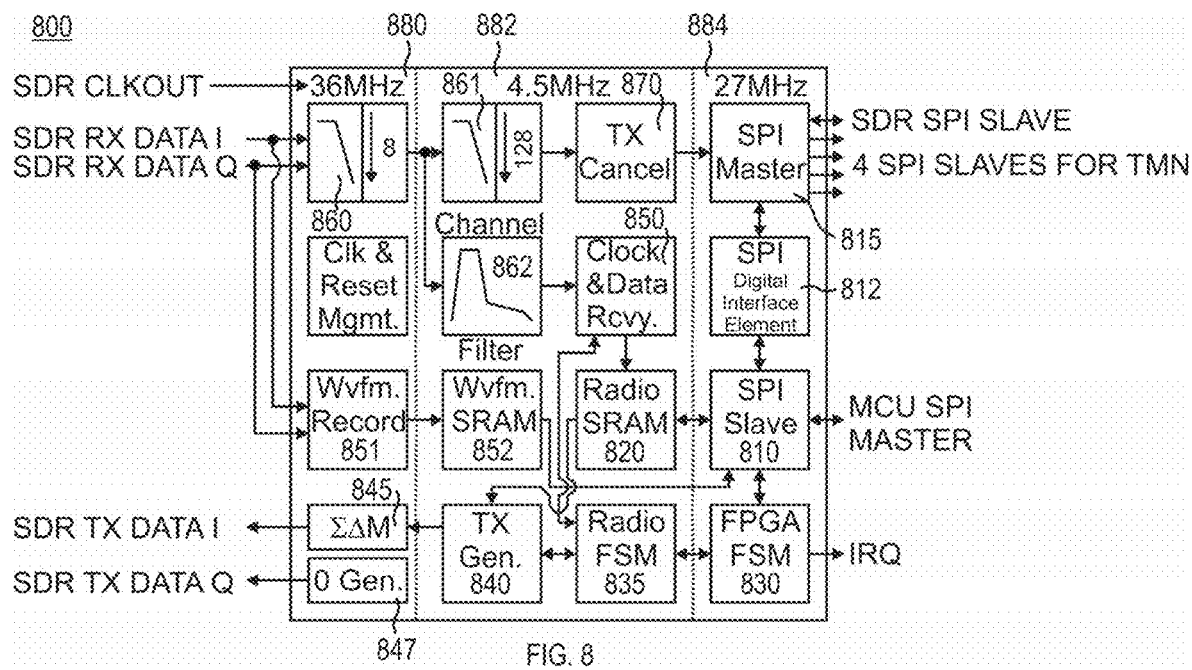
FIG. 8 is a schematic of an embodiment implementation of a RFID interrogator transceiver digital processor FPGA digital design.

FIG. 8 depicts FPGA digital design 800, where the FPGA on which FPGA digital design 800 is implemented is depicted as FPGA 430 in FIG. 4. The FPGA may be driven by MCU 410 through SPI Slave Interface 810. For a given RFID operation (e.g. inventory, program), MCU 410 may load Radio SRAM 820 through SPI Slave Interface 810 with the packet information required for transmit operations. Once this is done, MCU 410 may kick off one of several RFID operation by selecting the appropriate operation through SPI Slave Interface 810 and by sending the "GO RADIO" command to SPI Slave Interface 810. The "GO RADIO" command is handled by FPGA FSM 830, which is a high-level supervisor of the entire FPGA design. FPGA FSM 830 is the master of Radio FSM 835, which implements the RFID protocol on a packet-level basis. FPGA FSM 830 passes along the "GO RADIO" command to Radio FSM 835, which drives the Transmit Generation (TXGEN) Block 840, which synthesizes a baseband transmit waveform to be upconverted and transmitted by the transmitting element of SDR 450, and the RX Clock and Data Recovery Block 850, which demodulates and decodes the tag return signal, in several iterations over the course of a multi-packet RFID transaction before potentially asserting "DONE" to FPGA FSM 830, which in turn may pause radio operations and may issue an interrupt (IRQ) to MCU 410 to intervene. It is Radio FSM 835 that is responsible for ensuring that the strict latency requirements of RFID packet exchanges are met. After an RFID transaction is complete, MCU 410 may read out the result of the transaction from Radio SRAM 820 via SPI Slave Interface 810.

SPI traffic from MCU 410 can be directed to tunable microwave network 440 and SDR 450 through SPI digital interface element 812 and SPI Master 815. SPI Master 815 accepts inputs from the SPI digital interface element when Radio FSM 835 is idle. When Radio FSM 835 is processing RFID packets, tuning algorithm 600 is active and tuning algorithm hardware 700, encapsulated in the TX Cancel block 870, needs to access the SPI Master 815 in order to actuate the SDR 450 receiving element gain and the values of the tunable capacitive elements of tunable microwave network 440.

FPGA digital design 800 is segmented into 3 sections, 36 MHz Section 880, 4.5 MHz Section 882, and 27 MHz Section 884. The section immediately facing SDR 450 runs at 36 MHz since that this the frequency at which the example SDR digital subsystems run at. Running digital circuitry in a low-cost FPGA at such frequencies can provide to be area- and power-intensive. Therefore, most of FPGA digital design 800 resides in 4.5 MHz Section 882. Signals in the receive path are filtered in CIC Filter Block 860 and downsampled by 8 to reach this frequency. Baseband signals in the transmit path are generated at 4.5 MHz in Transmit Generation Block 840 and are upsampled by 8 for use in Transmit Sigma Delta Modulator 845. The interfaces between 36 MHz Section 880 and 4.5 MHz Section 882 are synchronous. 27 MHz Section 884 runs from the FPGA internal oscillator and is hence asynchronous to the other two sections. 27 MHz Section 884 runs from the internal oscillator since the FPGA SPI interfaces and FPGA FSM operates prior to the SDR 36 MHz output clock (CLKOUT) becoming available.

FPGA digital design 800 can also utilize the vast SRAM available on modern FPGAs to perform waveform recoding in Waveform Recording Block 851. The recorded data is stored in Waveform SRAM 852. The resulting data can be used to help better localize a particular RFID tag.

The FPGA receive section consists of CIC Filter 860, DC LPF Filter 861, Channel Filter 862, Clock and Data Recovery Block 850. CIC Filter 860 filters out high-frequency noise from the SDR 450 and downsamples by 8. DC LPF Filter 861 generates the complex DC transmit leakage proxy signals used as input to tuning algorithm 600 encapsulated in TX Cancel block 870. Channel Filter 862 isolates the tag return signal from most other signals so that it can be selectively processed by the Clock and Data Recovery Block 850, which extracts bits from the tag return signal.

The FPGA transmit section consists of Transmit Generation Block 840, Transmit Sigma-Delta modulator 845, and Zero Generation Block 847. Transmit Generation Block 840 generates the baseband transmit waveform at a 4.5 MHz clock rate. The Sigma-Delta Modulator 845 encodes this transmit baseband waveform into a 1-bit signal at 36 MHz for use as an input to the transmitting element of SDR 450. In order to save hardware in this example FPGA design, only one Sigma-Delta modulator is used, since the DSB-ASK transmit waveform utilized by example RFID interrogator 400 does not require it. Therefore, Zero Generation Block 847 drives the "Q" transmit input of SDR 450 with a high-low pattern with DC value of roughly 0.5, which results in a DC value of 0 at the SDR 450 DAC output. The high-low pattern of Zero Generation Block 847 may be adjusted to partially or completely calibrate the transmitting element of SDR 450.

Figure 9:
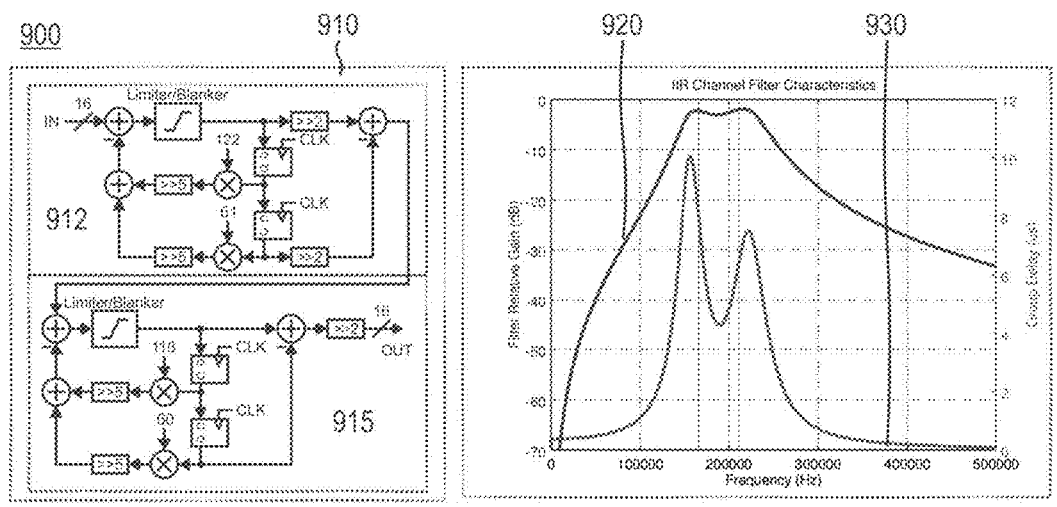
FIG. 9 is a schematic and illustration of a frequency response of an embodiment bandpass channel filter for an RFID interrogator receiver.

FIG. 9 shows a detailed schematic 910 of Channel Filter 862. Schematic 910 depicts two interconnected second-order infinite-impulse-response (IIR) digital resonator filters 912 and 915. The resonant frequencies of resonators 912 and 915 are spaced slightly apart in order to get the double-peaked bandpass filter characteristic depicted in Channel Filter Relative Gain Plot Curve 920. The peaks are immediately apparent in the Channel Filter Group Delay Plot Curve 930. The dual-digital resonator IIR filter can typically be designed to be more hardware-efficient than a more traditional finite-impulse-response (FIR) filter for a given level of out-of-band attenuation and gain flatness. The resonant frequencies of the two filters 912 and 915 can be chosen to be substantially similar to the maximum and minimum (or vice versa) allowable RFID tag return signal backscatter link frequencies so that the bandpass filter can always selectively pass the RFID tag return signal.

Figure 10:
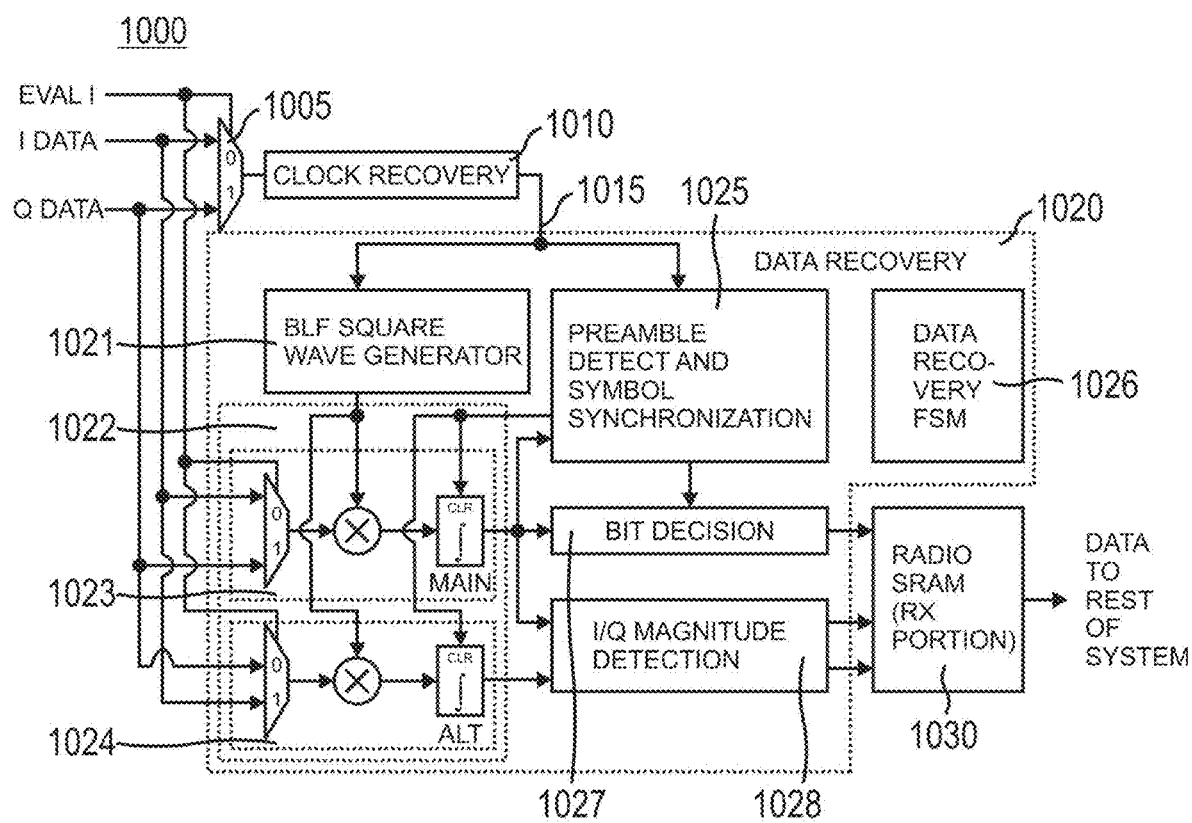
FIG. 10 is a schematic of an embodiment all-digital clock and data recovery system for an RFID interrogator receiver.

FIG. 10 depicts the clock and data recovery system 1000 that comprises Clock and Data Recovery Block 850. Incoming complex I DATA and Q DATA from Channel Filter 862 enter multiplexer 1005, which determines which of the I DATA or Q DATA will be used for clock recovery. In general, two Clock Recovery Circuits 1010 can be used to attempt a clock acquisition on both data streams, although for the embodiment described herein, only sufficient space was available on FPGA 430 for one Clock Recovery Circuit 1010. Both I DATA and Q DATA streams are passed to Data Recovery Circuit 1020. In Data Recovery Circuit 1020, the recovered clock signal 1015 is used to make a square wave at the RFID tag return signal backscatter link frequency (BLF) using Square Wave Generator 1021. The square wave output of Square Wave Generator 1021 assists in performing correlation on the input data streams in Correlator circuit 1022. One can think of this correlation operation as down-converting the data signal using the backscatter link frequency (BLF) of the RFID tag return signal and low-pass filtering the resulting output. Correlator circuit 1022 performs a near-optimal integrate-and-dump matched filtering operation after multiplication with the square wave to improve the SNR of the incoming signal prior to making bit decisions. Correlator circuit 1022 is comprised of two sub-circuits, with MAIN subcircuit 1023 processing the DATA stream fed to Clock Recovery Circuit 1010 and ALT subcircuit 1024 processing the DATA stream not fed to Clock Recovery Circuit 1010. The outputs of the correlator circuit 1022 are sent to bit decision block 1027, I/Q magnitude detection block 1028, and preamble detection/symbol synchronization block 1025. The I/Q magnitude detection block accumulates the integrate-and-dump circuit outputs over the course of an RFID tag return signal packet to obtain complex signal magnitude and phase data, which can be used to assist in localization of the RFID tag. The outputs of the bit decision block and the magnitude detection block are stored in Radio SRAM 1030, which corresponds to Radio SRAM 820 in FIG. 8. Data Recovery Circuit 1020 is controlled by a finite state machine 1026.

Figure 11:
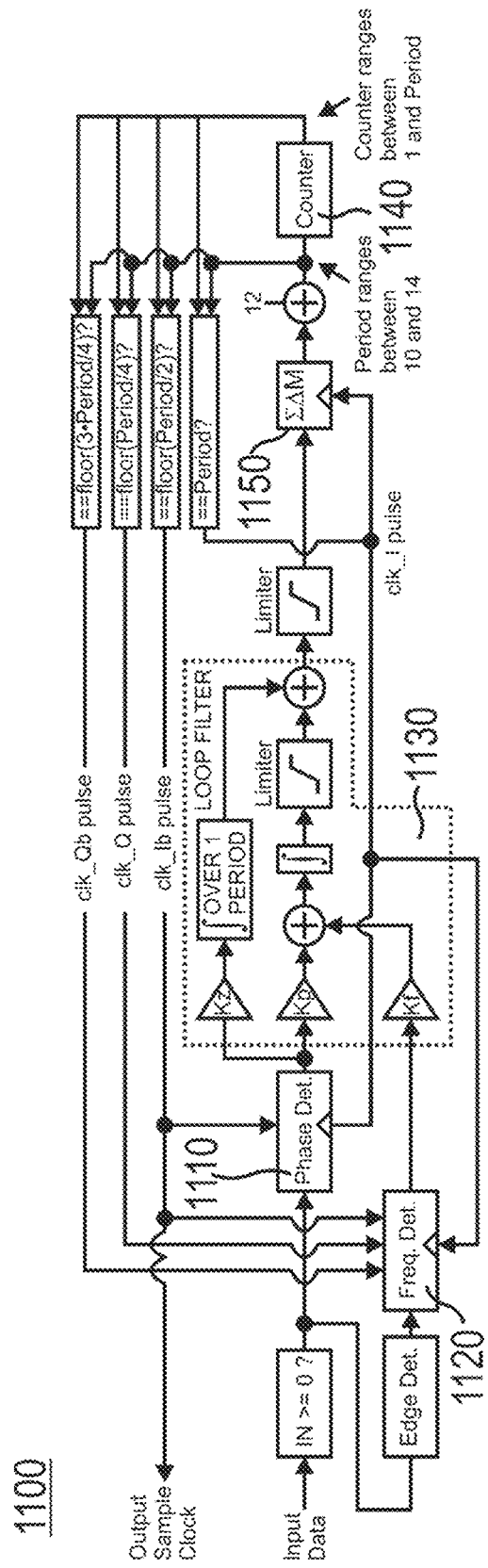
FIG. 11 is a schematic of an embodiment all-digital clock recovery circuit for an RFID interrogator receiver.

FIG. 11 shows Clock Recovery Circuit 1100, which is an example implementation of Clock Recovery Circuit 1010. Clock Recovery Circuit 1100 is an all-digital PLL that uses a tristate phase detector 1110 such as the one described in "A Self-Correcting Clock Recovery Circuit," by C. R. Hogge, J. Lightwave Technology, v. 3, no. 6, 1985, pp. 1312-14 and others described in "The Design of CMOS Radio-Frequency Integrated Circuits, Second Edition" by T Lee, Cambridge University Press, 2004, pp. 584-588 and a rotational frequency detector 1120 to generate error inputs to digital loop filter 1130. Instead of a VCO, the all-digital PLL uses counting element 1140 to generate a pulse every N clock cycles. This pulse serves as the clock to Data Recovery Circuit 1020. Since the optimal N at any given time is likely to be fractional, the value of N is dithered by Sigma-Delta Modulator 1150, which takes the loop filter 1130 output as its input. Counting element 1140 may be realized as, for example, a counter or a numerically controlled oscillator.

Figure 12:
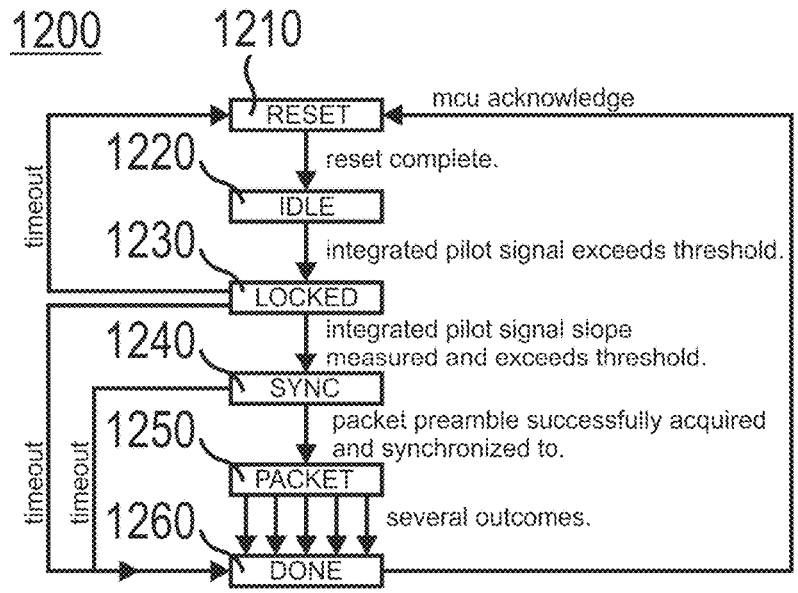
FIG. 12 is a flow chart of an embodiment state machine for the data recovery subsystem depicted in FIG. 11.

FIG. 12 shows Data Recovery Circuit State Machine 1200, which is an example implementation of finite state machine 1026. The State Machine is designed around the idea that an example RFID tag return signal packet is comprised of three subsequent sections: a pilot tone, a preamble to be used for timing synchronization, and a data section where the data to be returned by the tag is transmitted back to the interrogator. The state machine is also designed around the idea that tag return signal data is Miller-encoded with a particular number of backscatter link frequency (BLF) subcycles per bit as defined in "*EPC Radio-Frequency Identity Protocols Generation*-2 *UHF RFID: Specification for RFID Air Interface Protocol For Communications at* 860 *MHz*-960 *MHz Version* 2.0.0 *Ratified*". One way to consider this means in plain terms is to visualize the tag return signal carrier frequency being modulated with a square wave at the BLF and that on top of this, at some integer divisor, the data encoding is modulated on top of this faster square wave. For the purposes of this document, the number of such subcycles is given to be 8. The preamble is simply a section of predefined data bits, while the pilot is simply the RF carrier tone modulated by a square wave at the BLF without any additional data-related modulation.

Figure 13:
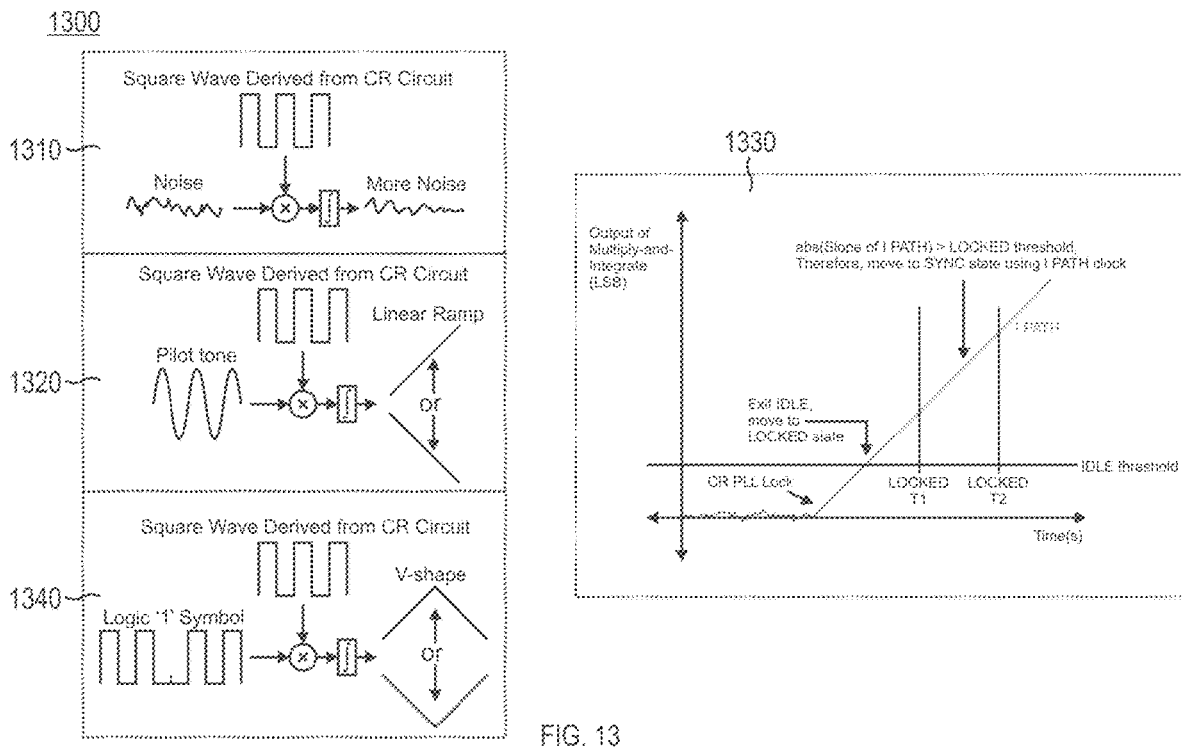
FIG. 13 is an illustration of the correlation operation of the data recovery subsystem depicted in FIG. 11.

State Machine 1200 initially goes through a RESET state 1210 which may clear out the state variables in Data Recovery Circuit 1020. Next, IDLE state 1220 is entered wherein the square wave from Square Wave Generator 1021 is used to multiply the incoming waveform data on I DATA and Q DATA in FIG. 10. As shown in drawing 1310 of FIG. 13, if only noise is present, the output of correlator circuit 1022 will also be noise. Although this noise will exhibit a random walk and eventually move in one direction or another, this movement will be negligible for the duration of an RFID tag return signal packet. When the RFID tag return signal pilot tone is present and Clock Recovery Circuit 1010 is locked, the output of the correlator circuit will move linearly in the positive or negative direction as shown in drawing 1320 of FIG. 13. Once the RFID tag return signal pilot tone is present, eventually the output of the MAIN integrate-and-dump subcircuit 1023 (or its absolute value) will exceed the IDLE threshold shown in drawing 1330 of FIG. 13, at which point Data Recovery Circuit State Machine 1200 will transition to LOCKED state 1230.

During the LOCKED state, the amplitude of the incoming tag backscatter return signal is estimated by running the MAIN correlator subcircuit 1023 for a defined interval, still during the tag backscatter return signal pilot tone period, and the resulting output absolute value compared against a LOCKED threshold which determines whether a tag is likely to be present or not. If the absolute value of the subcircuit 1023 output signal is below the LOCKED threshold by the time the defined interval is expired, this means that the system has likely falsely entered the LOCKED state and that the state machine should return to IDLE state 1220 to try to capture an RFID tag return signal pilot tone again. Otherwise, the state machine proceeds to SYNC state 1240.

In the Miller-modulated mode of operation for UHF RFID, the Clock Recovery Circuit can determine the boundary times for each of the tag return signal backscatter link frequency (BLF) half-periods (alternately described as "chips" herein), but since each half-period is only $\frac{1}{16}^{th}$ of each bit symbol, another mechanism is used to achieve synchronization with the bit symbols. A method of achieving such synchronization is proposed below.

Figure 14:
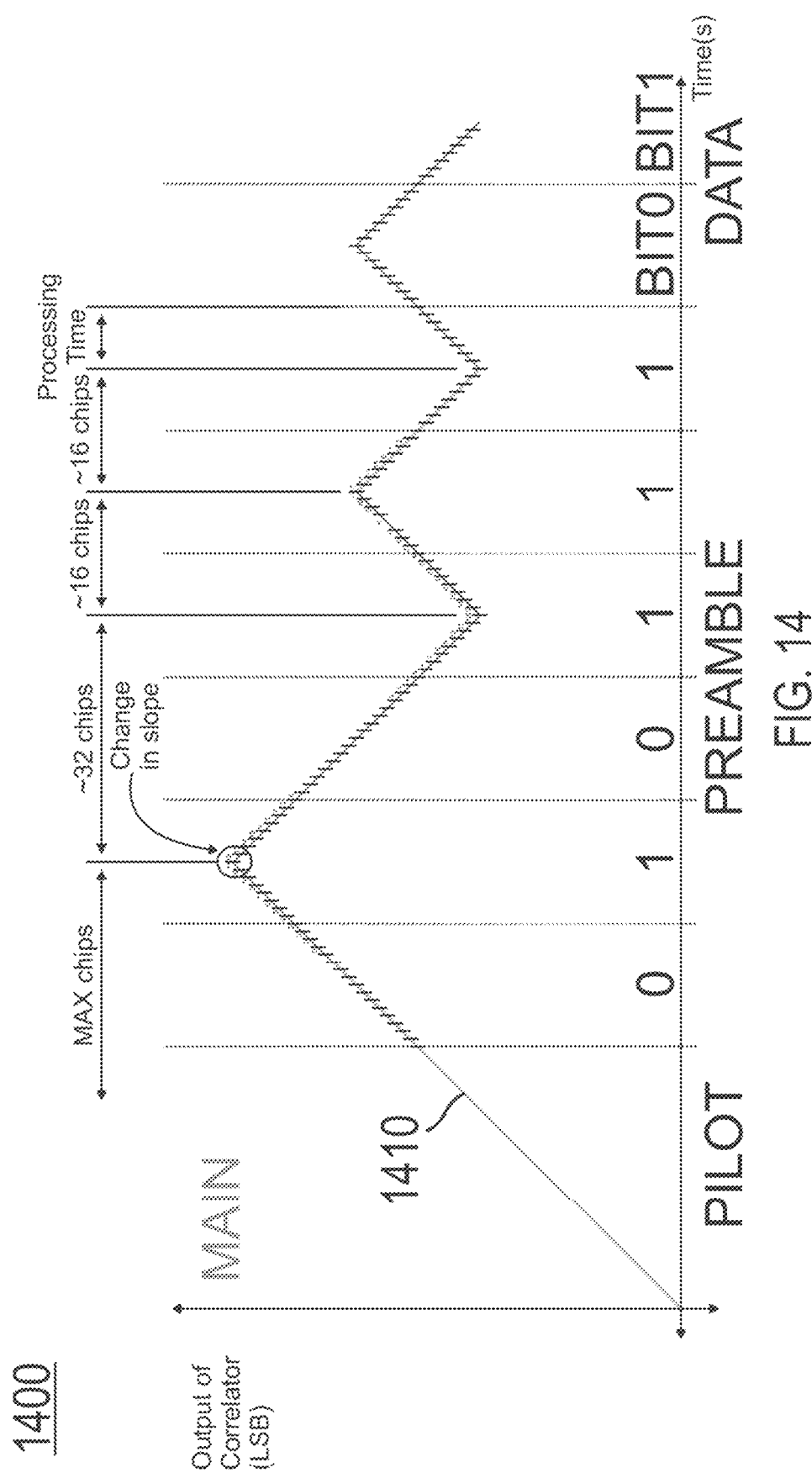
FIG. 14 is an illustration of the integration of the RFID packet pilot tone and preamble in the data recovery SYNC state depicted in FIG. 12.
Figure 15:
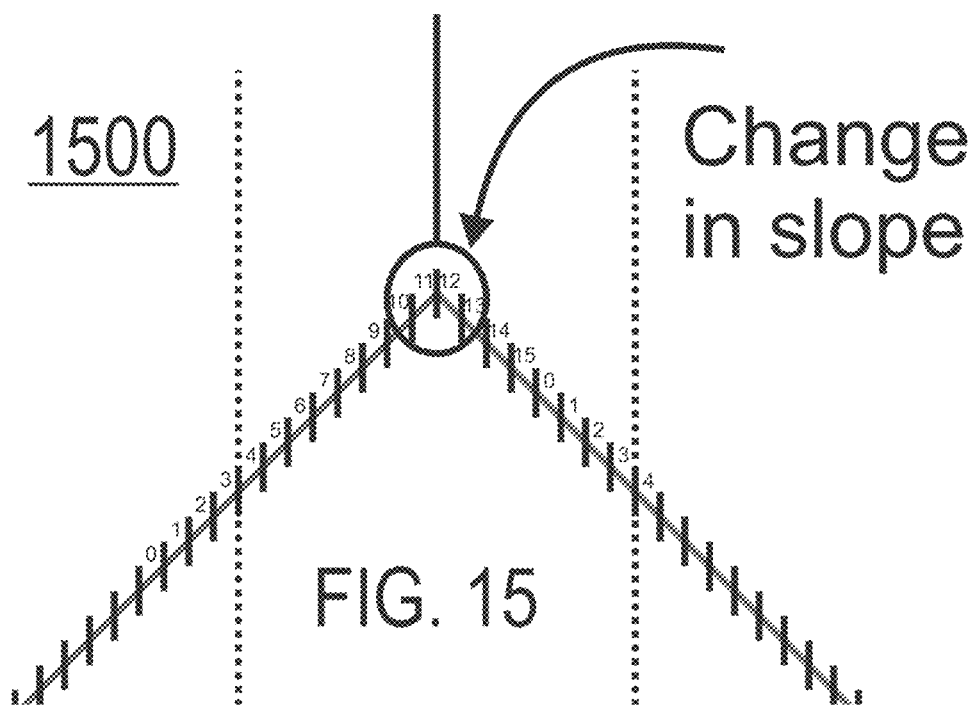
FIG. 15 is an illustration of the symbol position counter during the data recovery SYNC state depicted in FIG. 12.
Figure 16:
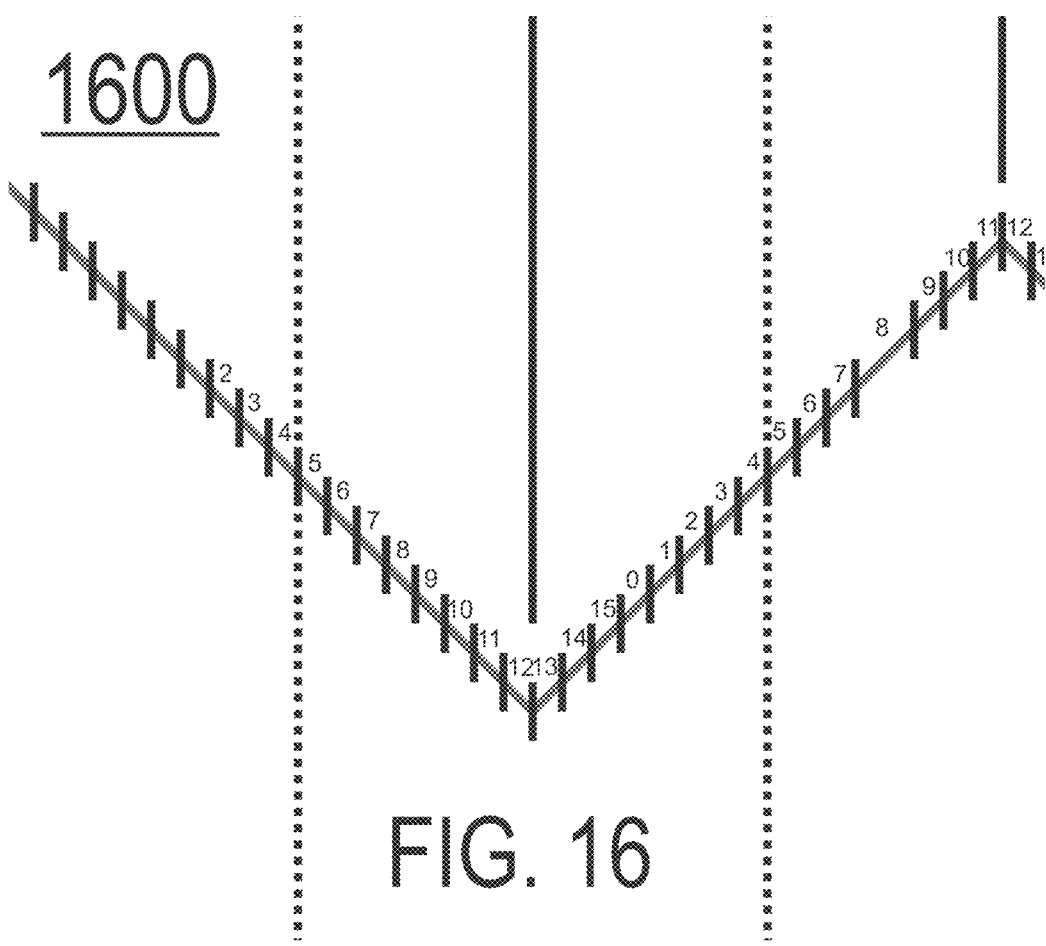
FIG. 16 is an illustration of the symbol position counter during the data recovery SYNC state depicted in FIG. 12 in a different position along the input waveform than in FIG. 15.

During SYNC state 1240, the MAIN correlator subcircuit 1023 output will look like the sawtooth-shaped curve 1410 in FIG. 14, as it will not be reset (dumped) during this state. Note that the preamble is the "0 1 0 1 1 1" pattern, defined in "*EPC Radio Frequency Identity Protocols Generation*-2 *UHF RFID: Specification for RFID Air Interface Protocol For Communications at* 860 *MHz*-960 *MHz Version* 2.0.0 *Ratified*", that occurs between the pilot signal and data bits. As shown in drawing 1340 of FIG. 13, when a logic '1' of the preamble passes through the correlator, a peak occurs in the correlator output due to the 180-degree phase shift that occurs in the middle of the logic '1' symbol. These peaks can be used to both detect the presence of the preamble and to determine the relative position of the packet symbols with respect to some known counter with a rollover value of 16. We will call this the Half Subcarrier Period Counter (16 is the number of half-periods in each bit symbol for the example case where Miller modulation with M=8 has been selected). The Half Subcarrier Period Counter in action can be seen in FIG. 15 and FIG. 16. The small numbers along the triangular curves in these figures represent the value of the Half Subcarrier Period Counter at any given moment of time. To determine whether a SYNC pattern has been found or not, another counter, called the Peak Space Counter herein, conducts a running count of half-periods between peak detections. At each peak, the Peak Space Counter value at the number of half-periods since the last peak is stored in a 3-element vector which, in hardware, can be implemented by a shift register. When a quantity [(32+/−X) (16+/−Y) (16+/−Y)] (where X and Y are small, somewhat arbitrary constants on the order of 3 or 4) is observed in the vector, the Data Recovery State Machine knows that the system has successfully acquired the preamble. Meanwhile, the Half Subcarrier Period Counter values at each peak are stored in another vector. Once the preamble has been successfully acquired, the Half Subcarrier Peak Counter vector values can be used to determine the relative position of the tag return signal data symbols with respect to the Half Subcarrier Period Counter. At this point, the scalar values within the Half Subcarrier Period Counter may be averaged in a modulo-16 sense (for example, the average of 14, 15, and 3 in a modulo-16 sense is 0) to estimate the Half Subcarrier Period Counter value, which typically occurs in the middle of the symbol. Otherwise, any of the scalar values in the Half Subcarrier Period Counter vector should suffice for this purpose. Adding 8 to this value (again for the example case of Miller Modulation with M=8) yields the Half Subcarrier Period Counter value at the symbol boundaries. This Boundary Value may be latched into a register for future reference over the duration of the tag return signal packet.

Figure 17:
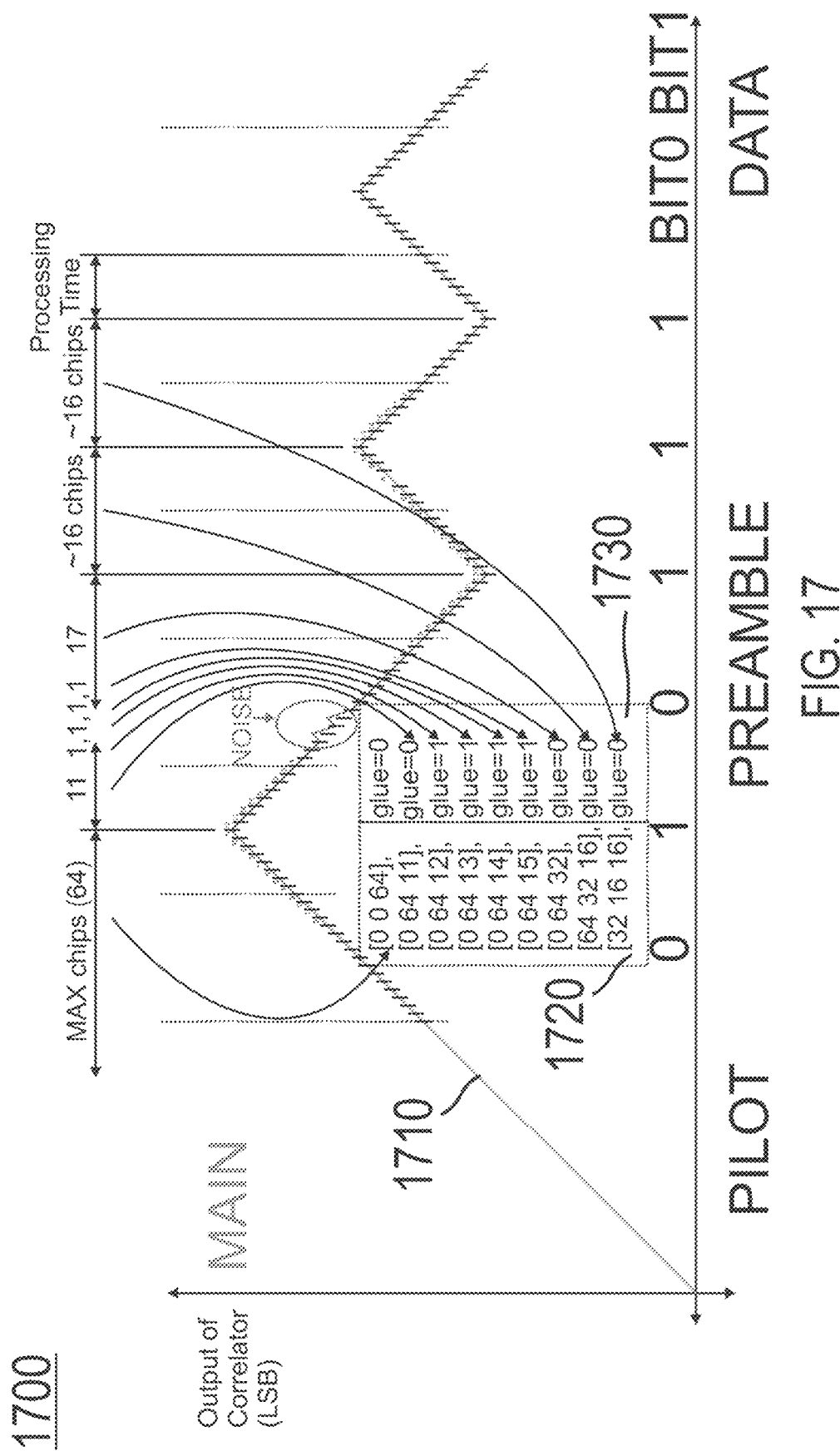
FIG. 17 is an illustration of an embodiment noise filtering algorithm for peak detection during the data recovery SYNC state depicted in FIG. 12.

It is worth wondering what happens if there is excessive noise on the input data: will there be small noise peaks in between the peaks of interest? The answer is yes: this can happen. In this event, the number of half-periods between the detected peaks will have a run of smaller values in between larger values. These smaller peak space (or peak spacing) values result from the noise and should be somehow neglected. This is depicted in FIG. 17. In order to overcome this problem, the Peak Space Counter vector-filling procedure is modified to accommodate these smaller values. In FIG. 17, the Peak Space Vector as a function of iteration is depicted as 1720. The modification is as follows:

1. When a peak space value of less than some upper threshold (an example value is 4) is detected, the Peak Space Vector is not shifted to the left with the new Peak Space Counter value being shifted in from the right. Rather, the new peak spacing value is added to the previous peak spacing value and a "glue" flag 1730 is set.
2. The "glue" flag indicates that the next Peak Space Counter value is also to be added to the rightmost value in the vector.
3. If the next peak spacing value is also less than the aforementioned threshold, the glue flag remains high after adding this value to the rightmost value in the vector. If not, the glue flag is set low.

4. Once the glue flag is set low, the next peak spacing value will again result in the Peak Space Vector shifting to the left and the new Peak Space Counter value being entered into the Peak Space Vector from the right.

Figure 18:
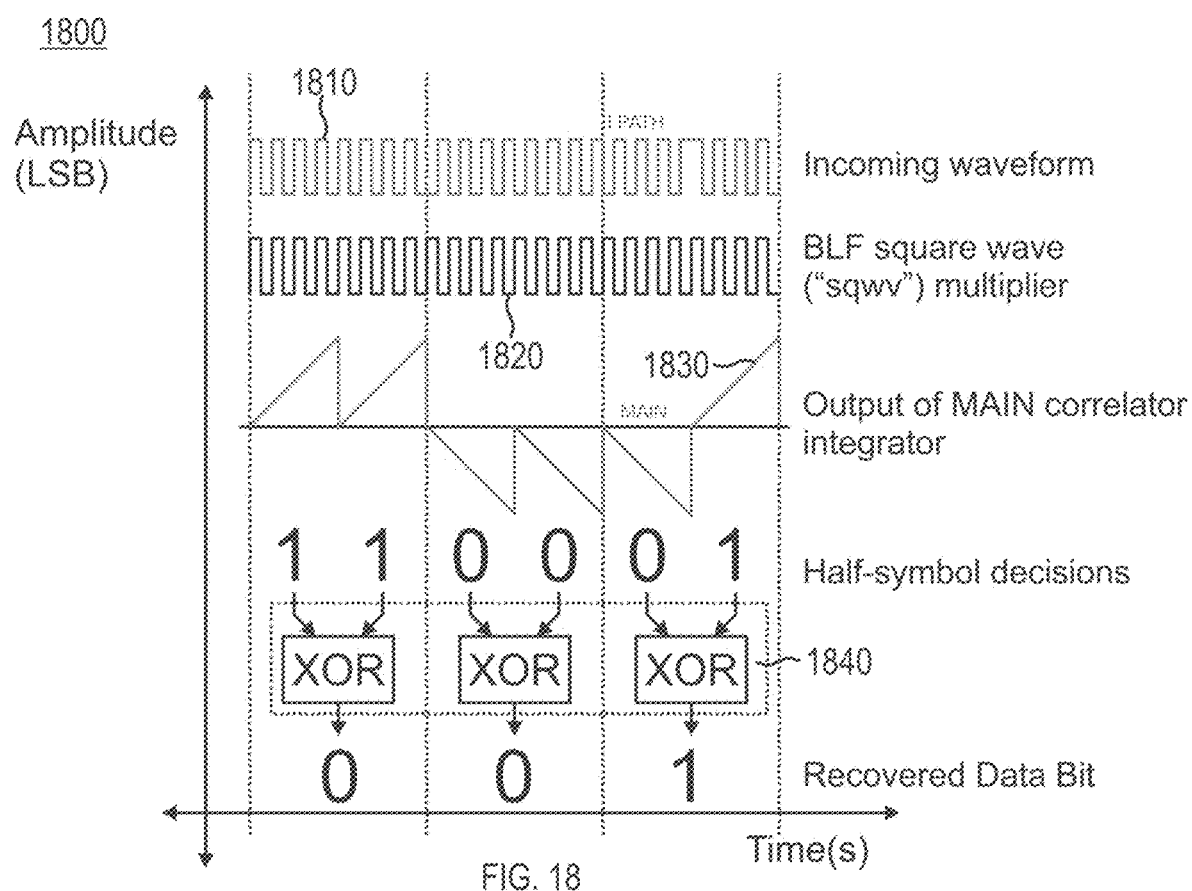
FIG. 18 is an illustration of bit decision making in the data recovery circuit during the PACKET state depicted in FIG. 12.

Once the Data Recovery State Machine sees that the Peak Space Vector has an acceptable set of values, the SYNC state will be considered successfully completed. At this point, the Data Recovery State Machine enters the PACKET state. In the PACKET state, the MAIN correlator subcircuit 1023 is used to make bit decisions, as shown in drawing 1800 in FIG. 18. The MAIN correlator subcircuit 1023 multiplies the incoming waveform 1810 by the square wave 1820 generated from BLF Square Wave Generator 1021. Between each half-symbol boundary, which occurs roughly when the Half Subcarrier Period Counter equals the Boundary Value, the output of the correlator can generate a triangle-like shape as in sawtooth curve 1830. At the end of each half-symbol, the sign of the MAIN correlator subcircuit 1023 is compared against 0. After the comparison, the MAIN integrator is cleared in preparation for the next half-symbol bit decision. At the end of each full bit symbol, the bit decisions for the half symbols are compared as depicted by the XOR gates 1840. If the half symbols are the same, this indicates that the bit was a "0". If they are different, this indicates that the bit symbol was a '1'.

Figure 19:
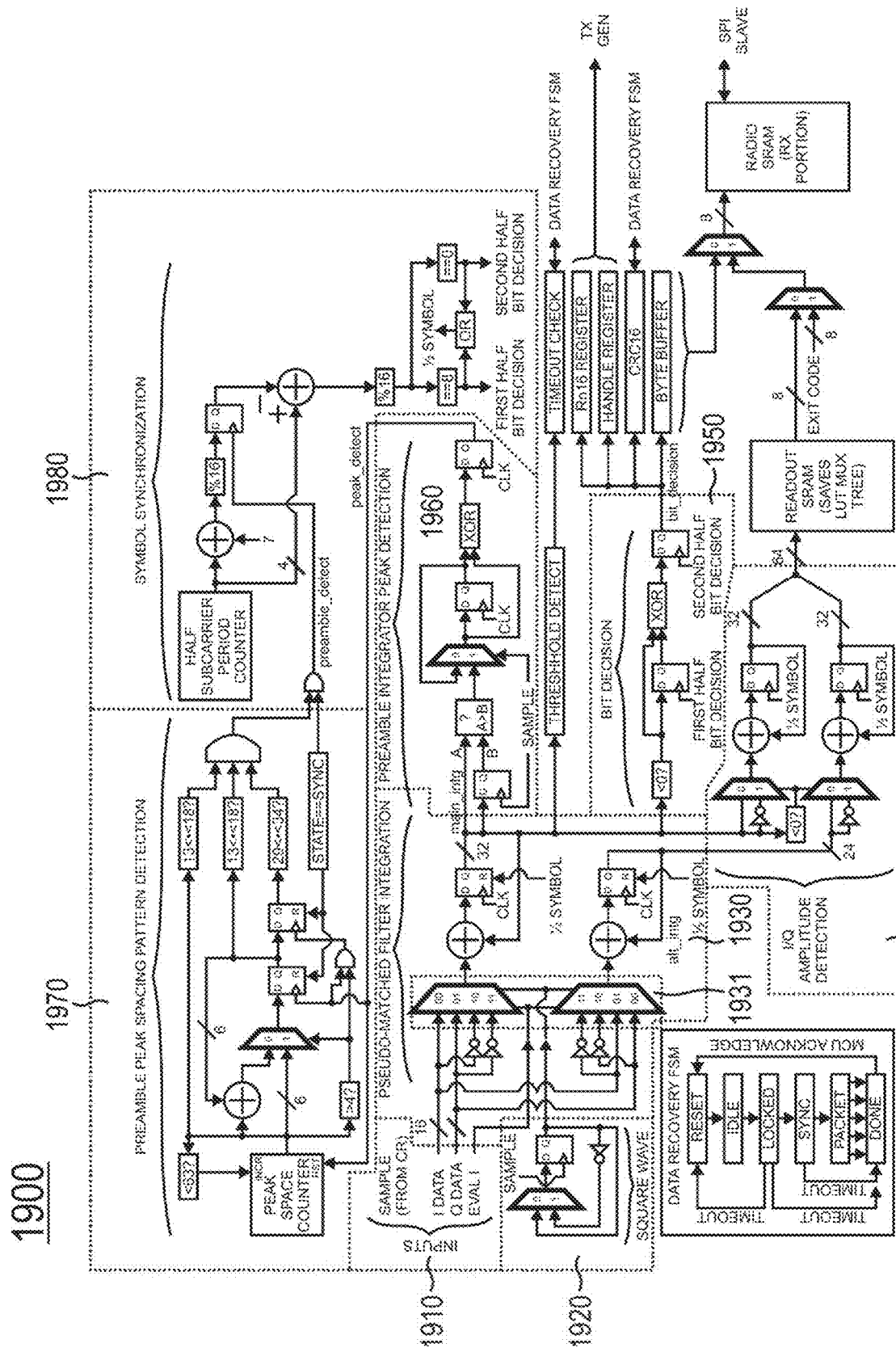
FIG. 19 is a schematic of an embodiment all-digital data recovery circuit for an RFID interrogator receiver.

FIG. 19 depicts the digital hardware circuitry that might be used in an example Data Recovery Circuit. There are 4 inputs 1910: I DATA, Q DATA, SAMPLE (the pulse output of the Clock Recovery Circuit), and EVAL I (which is logic high if I DATA is to be sent to the MAIN correlator). The BLF Square Wave Generator 1920 can be implemented by an inverter, a multiplexer, and a register. The Correlators 1930 are under the header "Pseudo-Matched Filter Integration". Multiplication with the BLF Square Wave is handled by multiplexers 1931. I/Q Amplitude Detection 1940 can be handled by a separate set of integrate-and-dump circuits, to be integrated only over the data section of the tag return signal.

FIG. 20 depicts an example Transmit Baseband Waveform Generator (TXGEN) 2000, which is also encapsulated by TXGEN block 840 in FIG. 8. TXGEN 2000 is controlled by an opcode-driven finite state machine (FSM) 2010 which, in turn, controls a high/low counter 2020 whose output ultimately becomes a DSB-ASK waveform at RF in the transmitting element of SDR 450. The high/low counter can be thought of, and can potentially be implemented as, a loadable countdown timer driving a toggle element which toggles a single-bit digital output each time the countdown timer expires. A set of example 4-bit opcodes for TXGEN 2000 are enumerated in FIG. 21. For example, an RFID 'RTCAL' opcode corresponds to a symbol, which causes high/low counter 2020, running at a digital clock frequency of 4.5 MHz, to output a high (digital logic 1) value for 222 clock cycles (49.3 microseconds) and a low (digital logic 0) value for 42 clock cycles (9.3 microseconds) to realize a UHF RFID RTCAL signaling symbol.

The high/low counter values are translated from the desired input symbol by symbol-to-count translator 2070. Symbol-to-count translator 2070 may be implemented by a digital look-up table. The symbol intended to be generated by TXGEN 2000 is provided to translator 2070 by a symbol multiplexer 2060 which is controlled by FSM 2010 and accepts symbol inputs from a variety of sources. For example, one class of symbols comprises data 0 and 1 bits. Another class of symbols comprises a subset of available opcodes.

The opcodes for a given RFID transaction are stored in the TX section of Radio SRAM 820. This section of Radio SRAM 820 is depicted as TX RAM 2030 in FIG. 20. TX RAM 2030 can be segmented such that each segment corresponds to a different packet type defined in "*EPC Radio-Frequency Identity Protocols Generation-2 UHF RFID: Specification for RFID Air Interface Protocol For Communications at* 860 *MHz*-960 *MHz Version* 2.0.0 *Ratified*", such as Select Segment 2031, Query Segment 2032, or Lock Segment 2033. Each time a change is required to be made to a packet, for example, to change the number of tags to be queries in each query round, the MCU must rewrite the corresponding segment of TX RAM 2030 prior to recommencing radio operations. TXGEN 2000 also contains cyclic redundancy check unit 2041 to compute, store, and output the 16-bit cyclic redundancy check (CRC) of an outgoing packet, shift register 2042 to hold a 16-bit random number identifier (RN16) of an incoming packet processed by the data recovery circuit, and shift register 2043 to hold an RFID tag handle (HANDLE) of an incoming packet processed by the data recovery circuit.

Figure 22:
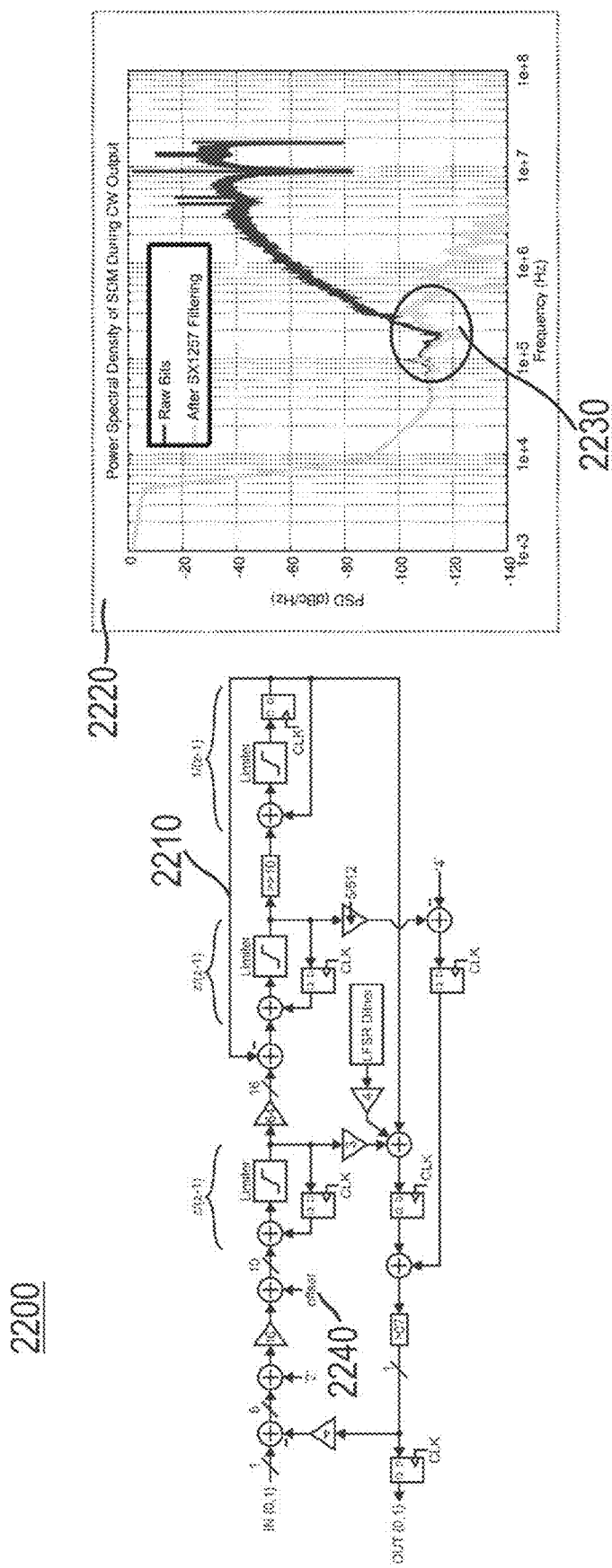
FIG. 22 is a schematic of an embodiment implementation of a digital sigma-delta modulator utilized to generate a 1-bit transmit signal for a SDR transmitter along with an illustration of output noise power spectral density as a function of frequency.

FIG. 22 depicts an example third-order Sigma-Delta modulator 2200 which converts the TXGEN 2000 unipolar digital output signal (either 1 or 0) to a bipolar output signal compatible with the 1-bit DACs present on the SDR 450 used in an example implementation. This is necessary because the DACs used on the SDR 450 in an example implementation require a bipolar signal to be represented on a single digital signal line. A key improvement to Sigma Delta Modulator 2200 is feedback path 2210, which results in a zero in the noise transfer function at the tag return signal backscatter link frequency (BLF). This zero is seen as notch 2230 in Sigma Delta Modulator noise output power spectral density plot 2220. This zero is advantageous because the Sigma Delta Modulator output noise appears in the transmit leakage and will not be completely cancelled by the tunable microwave network. In order to reduce the noise further, the zero in the noise transfer function is added. This zero can be made programmable to support different tag return signal backscatter link frequencies. DC offset compensation of the SDR 450 DAC chain is partially accomplished by adding Offset 2240 to the input signal. It should be noted that this Sigma-Delta Modulator 2200 is encapsulated in TX Sigma Delta Modulator 845 in FIG. 8.

What is claimed is:
1. A RFID interrogator transceiver comprising:
an antenna;
a transmitting element operatively coupled to the antenna;
a digital processor operatively coupled to the transmitting element, the digital processor comprising a transmit baseband waveform generator, the transmit baseband waveform generator comprising:
a toggle element operatively coupled to the transmitting element;
a countdown timer operatively coupled to the toggle element;
a symbol-to-count translating element operatively coupled to the countdown timer;
a symbol multiplexer operatively coupled to the symbol-to-count translating element;
a random access memory organized to contain an arrangement of opcodes operatively coupled to the symbol multiplexer;

an address counter operatively coupled to the random access memory; and a finite state machine operatively coupled to the address counter, the random access memory, and the symbol multiplexer, the finite state machine configured to increment the address counter and to interpret the opcodes from the random access memory.

2. The RFID interrogator transceiver of claim 1, wherein the antenna, a directional coupler, a signal source, a signal receiver, a tunable microwave network, and a control unit are physically attached to form a single physical unit.

3. The RFID interrogator transceiver of claim 1, wherein the digital processor also comprises a sigma delta modulator, the sigma delta modulator operatively coupled to the toggle element.

4. The RFID interrogator transceiver of claim 3, wherein the sigma delta modulator is configured to realize a zero in its noise transfer function at a RFID tag return backscatter link frequency.

5. The RFID interrogator transceiver of claim 1, wherein the digital processor also comprises a cyclic redundancy check unit, the cyclic redundancy check unit operatively coupled to both an input and an output of the symbol multiplexer.

6. The RFID interrogator transceiver of claim 1, wherein the digital processor also comprises a register configured to accept a 16-bit random number from a data recovery unit.

7. The RFID interrogator transceiver of claim 1, wherein the digital processor also comprises a register configured to accept an RFID tag handle identifier from a data recovery unit.

8. A RFID interrogator transceiver comprising:
an antenna;
a receiving element operatively coupled to the antenna;
a digital processor operatively coupled to the receiving element, the digital processor comprising a channel bandpass filter, the channel bandpass filter comprising:
a first second-order infinite-impulse-response digital resonator filter operatively coupled to the receiving element and configured at a first resonant frequency; and
a second second-order infinite-impulse-response digital resonator filter operatively coupled to the first second-order infinite-impulse-response digital resonator filter and configured at a second resonant frequency,
wherein the channel bandpass filter is operatively coupled to a clock recovery circuit, the clock recovery circuit comprising:
a tristate phase detector;
a rotational frequency detector; and
a sigma-delta modulator configured to provide an input to a counting element.

9. The RFID interrogator transceiver of claim 8, wherein the first resonant frequency is substantially similar to a lowest permissible backscatter link frequency of a tag return signal.

10. The RFID interrogator transceiver of claim 8, wherein the first resonant frequency is substantially similar to a highest permissible backscatter link frequency of a tag return signal.

11. The RFID interrogator transceiver of claim 8, wherein the counting element is a numerically controlled oscillator.

12. The RFID interrogator transceiver of claim 8, wherein the counting element is a digital counter.

* * * * *